(12) United States Patent
Iwamatsu et al.

(10) Patent No.: US 9,047,113 B2
(45) Date of Patent: Jun. 2, 2015

(54) VIRTUAL MACHINE MIGRATING SYSTEM AND METHOD

(75) Inventors: Noboru Iwamatsu, Kawasaki (JP); Naoki Nishiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 577 days.

(21) Appl. No.: 13/298,904

(22) Filed: Nov. 17, 2011

(65) Prior Publication Data

US 2012/0137292 A1 May 31, 2012

(30) Foreign Application Priority Data

Nov. 26, 2010 (JP) .................................. 2010-264339

(51) Int. Cl.
*G06F 9/455* (2006.01)

(52) U.S. Cl.
CPC .... *G06F 9/45558* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 2008/0005297 | A1* | 1/2008 | Kjos et al. | 709/223 |
| 2008/0072223 | A1* | 3/2008 | Cowperthwaite et al. | 718/1 |
| 2009/0249366 | A1* | 10/2009 | Sen et al. | 719/327 |
| 2010/0036995 | A1* | 2/2010 | Nakayama et al. | 710/316 |

FOREIGN PATENT DOCUMENTS

JP 2009-259108 11/2009

OTHER PUBLICATIONS

"Intel® Virtualization Technology for Directed I/O", Architecture Specification Revision 1.2, Sep. 1, 2008.

* cited by examiner

*Primary Examiner* — Emerson Puente
*Assistant Examiner* — Jonathan R Labud
(74) *Attorney, Agent, or Firm* — Fujitsu Patent Center

(57) ABSTRACT

A virtual machine migration method conducted in a virtual machine migration system that includes a virtual machine of a migration source computer and a migrating target computer. The migration source computer conducts processing to send host physical address information of an MMIO region corresponding to a device used by the virtual machine through directed I/O to a migration target computer, and to cause a connection target of the device to be switched to the migration target computer by a switching device that connects the device to the computers. The migration target computer conducts processing to allocate an MMIO region corresponding to the host physical address information sent by the migration source computer, to the device connected to the computers by the switching device.

19 Claims, 25 Drawing Sheets

FIG. 10

| BDF NUMBER | VMID | PCI SLOT NUMBER | UPSTREAM PORT NUMBER | ... |
|---|---|---|---|---|
| 01:0a:0 | VM-001 | 1 | 2 | ... |
| ... | ... | ... | | ... |
| : | : | : | | : | t1

FIG. 11

| DOWNSTREAM PORT NUMBER | UPSTREAM PORT NUMBER | VENDOR ID | DEVICE ID | ADDRESS MATCH REQUIREMENT FLAG |
|---|---|---|---|---|
| 1 | 8 | 0101 | 197b | FALSE |
| 2 | | | | |
| 3 | 2 | 1002 | 5b65 | TRUE |
| ... | ... | ... | ... | ... |
| 8 | | | | |

FIG. 14

| DOWNSTREAM PORT NUMBER | STARTING ADDRESS | SIZE |
|---|---|---|
| 3 | 0xfddf0000 | 64KB |
| ⋮ | ⋮ | ⋮ | t2

FIG. 23A

| VMID | OPERATING PRIORITY LEVEL |
|---|---|
| VM-001 | -11 |
| VM-002 | -3 |
|  |  |
| VM-102 | -5 | t3

FIG. 23B

|  | MEANINGS OF OPERATING PRIORITY LEVELS |
|---|---|
| 0 | TERMINATION AND MIGRATION NOT PERMITTED |
| -1 to -4 | MIGRATION PERMITTED, TERMINATION NOT PERMITTED |
| -5 | MIGRATION PERMITTED, TERMINATION PERMITTED |

VIRTUAL MACHINE MIGRATING SYSTEM AND METHOD

CROSS-REFERENCE TO RELATED APPLICATIONS

This application is based upon and claims the benefit of priority of the prior Japanese Patent Application No. 2010-264339, filed on Nov. 26, 2010, the entire contents of which are incorporated herein by reference.

FIELD

The embodiments discussed herein are related to a virtual machine migrating system, a virtual machine migrating program, and a virtual machine migrating method.

BACKGROUND

As means for improving I/O performance in virtualized technology, a technology called directed I/O that directly allocates a peripheral component interconnect (PCI) device to a virtual machine is installed as a hardware function (see, for example, Japanese Patent Laid-Open No. 2009-259108, and "Intel (R) Virtualization Technology for directed I/O" Architecture Specification Rev. 1.2).

A portion of the memory of a host computer is allocated as virtual machine memory space in a virtual machine. A physical address recognized by a virtual machine (GPA: Guest-Physical Address) is different from a physical address in a host computer (HPA: Host-Physical Address). A conversion between the GPA and the HPA is required when a direct access is conducted from a virtual machine to a PCI device.

Directed I/O uses hardware (directed I/O hardware) to conduct address conversion (DMA remapping) between the GPA and the HPA to conduct a direct access memory (DMA) transfer between the virtual machine and the PCI device. A PCI configuration space that conducts setting of the PCI device, and device interruption transmission and the like are emulated by virtualization software and provided to the virtual machine. As a result, the virtual machine can treat an actual PCI device as if it is directly connected to the virtual machine.

FIG. 1 illustrates a DMA transfer using DMA remapping. In FIG. 1, a host physical address space s1 is a physical address space in a host computer. A guest physical address space s2 is a physical address space of a virtual machine that operates on the same host computer.

An MMIO regional is a memory region allocated in the host physical address space s1 for a memory mapped I/O corresponding to a PCI device v1 connected to the host computer. An MMIO region a2 is a memory region allocated in the guest physical address space s2 for the memory mapped I/O corresponding to the PCI device v1.

When an access (DMA transfer) to a PCI device is conducted on the virtual machine, the access is conducted with respect to the address in the MMIO region a2. The address in the MMIO region a2 is converted to an address in the MMIO regional by DMA remapping. As a result, access to the PCI device v1 can be achieved.

In another virtualization technology method, migration of a virtual machine operating in one host computer to another host computer while the virtual machine is in an operating state is called "live migration." Live migration is used, for example, for distributing operational management loads and for mitigating failures and the like. In live migration, the CPU and hardware registers states, memory contents, I/O transfers states and the like all need to match before and after migrating the virtual machine.

A PCI device used in the migration source host computer cannot be used all the time by the virtual machine in the migration target host computer. This is because the PCI device used in the migration source host computer is not connected to the migration target host computer. Therefore, migration of a virtual machine using a PCI device through directed I/O cannot be carried out by live migration.

However, by using a PCI switch, connections from multiple host computers to one PCI device can be shared. Here, "shared" does not necessarily indicate they can be used at the same time. "Shared" indicates that the PCI device connection target host computer can be changed by switching connection relationships in the PCI switch without changing physical wiring. Sharing of a PCI device using a PCI switch has been formulated in the Multi Root I/O Virtualization (MR-IOV) standard using PCI-SIG.

It is possible to share the same PCI device from the virtual machine migration source and migration target host computers using a PCI switch. Therefore, it is conceivable that live migration of a virtual machine using directed I/O is possible between host computers connected to a PCI switch.

However, operations using directed I/O cannot be guaranteed for all PCI devices. For example, it has been found that directed I/O does not function normally with some host adaptors or graphics cards and the like. Conversion between the GPA and HPA during DMA transfers using directed I/O is conducted by hardware. When processing to invalidate this type of conversion is conducted by the hardware, the PCI device may not operate normally. For example, a device driver of the PCI device may try to access a PCI device address (HPA) obtained from the firmware on the PCI device from the virtual machine. In this case, the DMA address conversion may not work and the PCI device may not operate as normal.

For this type of PCI device, it is necessary to build a PCI configuration space to allow access to the correct address even when DMA address conversion does not work. Thus, by matching the MMIO region physical address of the PCI device host computer (HPA) and the MMIO region physical address of the virtual machine (GPA), it has been found that normal operation is possible even when using directed I/O.

FIG. 2 illustrates an HPA and GPA matching state. The same reference numerals used in FIG. 1 are used for the same components in FIG. 2 and explanations thereof will be omitted.

In FIG. 2, the position of the MMIO regional of the host physical address space s1 matches the position of the MMIO region a2 of the guest physical address space s2. In FIG. 2, the matching of the positions indicates that the two MMIO region addresses match.

When conducting live migration of a virtual machine using a PCI device in a state where the HPA and GPA match, it is conceivable that the virtual machine can even use the PCI device in the migration target as long as the state is maintained in the migration target.

However, the firmware (BIOS (basic input/output system)) and the operating system (OS) of the host computer decide the allocation of the physical address of the MMIO region of the PCI device on the host computer at the time of configuration. The physical address of the MMIO region of the PCI device is a value that changes according to the type of host computer and the device configuration of the host computer and the like. Even when a PCI device can be referred to by multiple host computers through the use of a PCI switch, the MMIO region physical addresses of the PCI device on each of the host computers do not necessarily match. That is, the PCI device MMIO region is set to an open region in the migration target host computer that detects a PCI device hot plug from the PCI switch. There is no guarantee that the host physical address of the applicable MMIO region will match the MMIO region host physical address allocated to the PCI device in the migration source host.

SUMMARY

According to an aspect of the embodiment, a virtual machine migration method conducted in a virtual machine migration system that includes a virtual machine of a migration source computer and a migrating target computer. The migration source computer conducts processing to send host physical address information of an MMIO region corresponding to a device used by the virtual machine through directed I/O to a migration target computer, and to cause a connection target of the device to be switched to the migration target computer by a switching device that connects the device to the computers. The migration target computer conducts processing to allocate an MMIO region corresponding to the host physical address information sent by the migration source computer, to the device connected to the computers by the switching device.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 10 illustrates an example of a directed I/O device table.

FIG. 11 illustrates an example of a device attribute table.

FIG. 14 illustrates an example of a connection reservation table.

FIGS. 23A and 23B illustrate examples of a virtual machine operating priority level table.

DESCRIPTION OF EMBODIMENTS

Figure 1:
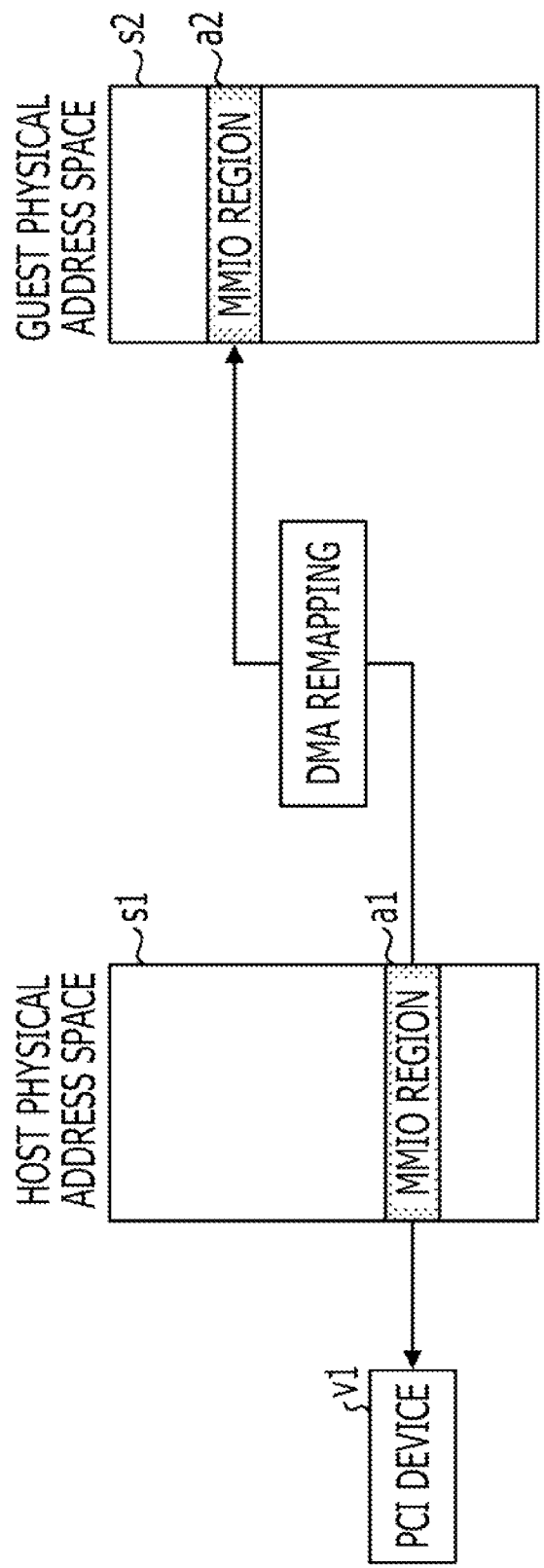
FIG. 1 illustrates a DMA transfer using DMA remapping.
Figure 2:
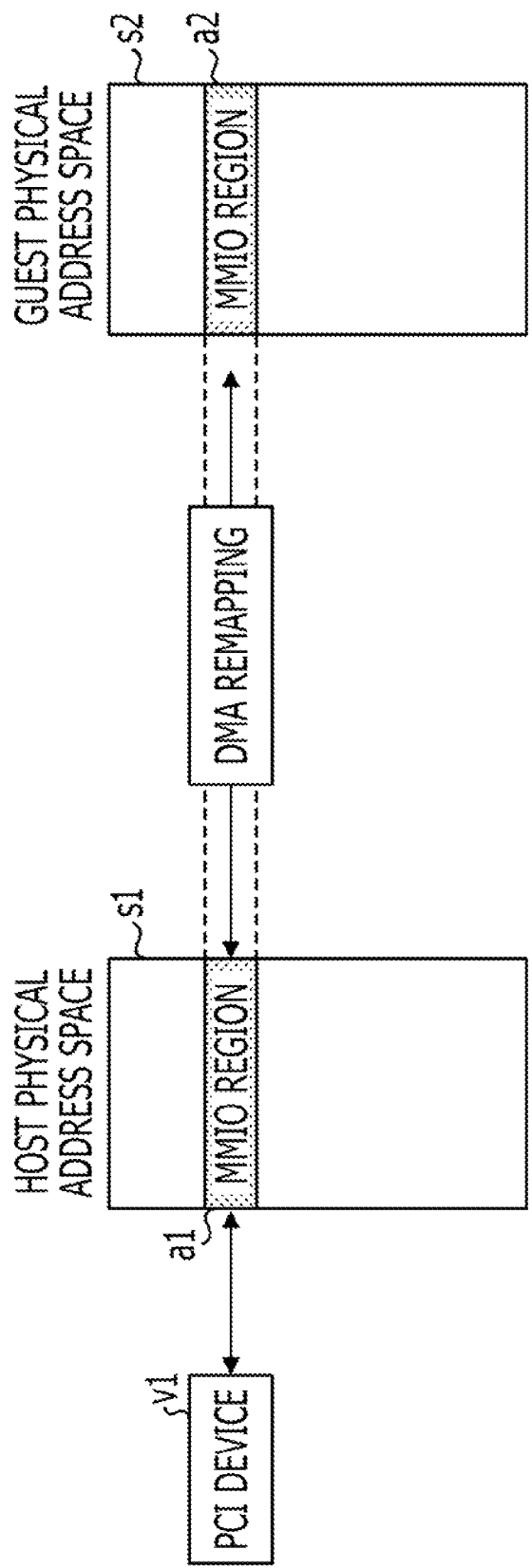
FIG. 2 illustrates an HPA and GPA matching state.
Figure 3:
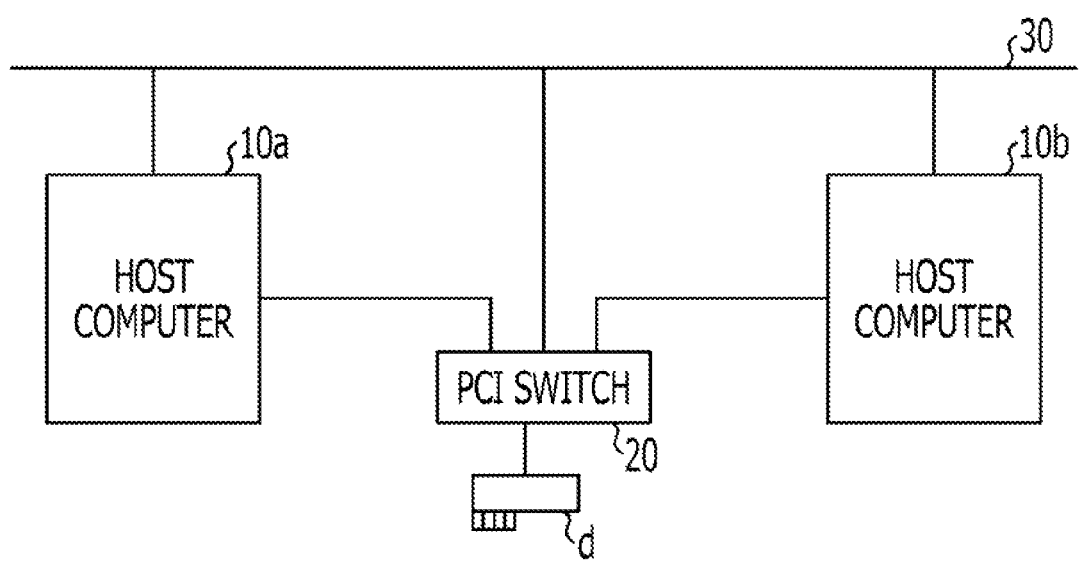
FIG. 3 illustrates a system configuration example according to an embodiment of the present invention.

Embodiments of the present invention will be explained hereinbelow with reference to the drawings. FIG. 3 illustrates an exemplary system configuration according to an embodiment of the present invention. In FIG. 3, a host computer 10a and a host computer 10b (hereinbelow referred to collectively as "host computer 10" when not differentiated between the two) are communicably connected via a network 30 (wired or wireless) such as a local area network (LAN) and the like.

The host computers 10 are computers having a virtual machine operating environment. In the present embodiment, an active virtual machine operating in the host computer 10a is live-migrated to the host computer 10b. Live migration indicates causing a virtual machine in an operating state to be migrated "as is" between host computers. Hereinbelow, "live migration" will simply be referred to as "migration."

Further, a PCI switch 20 is connected to the network 30. The PCI switch 20 is a device for allowing the same peripheral component interconnect (PCI) device to be shared by the host computers 10. The PCI switch 20 is an example of a switching device according to the present embodiment. In FIG. 3, a PCI device d is connected to a downstream side port of the PCI switch 20 via a certain cable. Moreover, an upstream side port of the PCI switch 20 is connected to a PCI slot in each of the host computers 10 via certain cables. Therefore, in FIG. 3, the PCI switch 20 can allow the PCI device d to be shared by the host computer 10a and the host computer 10b. Here, "shared" does not necessarily indicate used at the same time. "Shared" indicates that the PCI device connection target host computer can be changed by switching a connection relationship in the PCI switch without changing physical wiring. The PCI switch 20 may be a device complying with the Multi Root I/O Virtualization (MR-IOV) standard.

PCI switch 20 is connected to the network 30 because, according to the present embodiment, the PCI switch 20 conducts information communication between the host computers 10. For example, an instruction to switch the connection target host computer 10 of the PCI device d is transferred through the network 30 by the PCI switch 20. According to the present embodiment, the PCI device d is an example of a device used through directed I/O by a virtual machine operating in the host computer 10.

Figure 4:
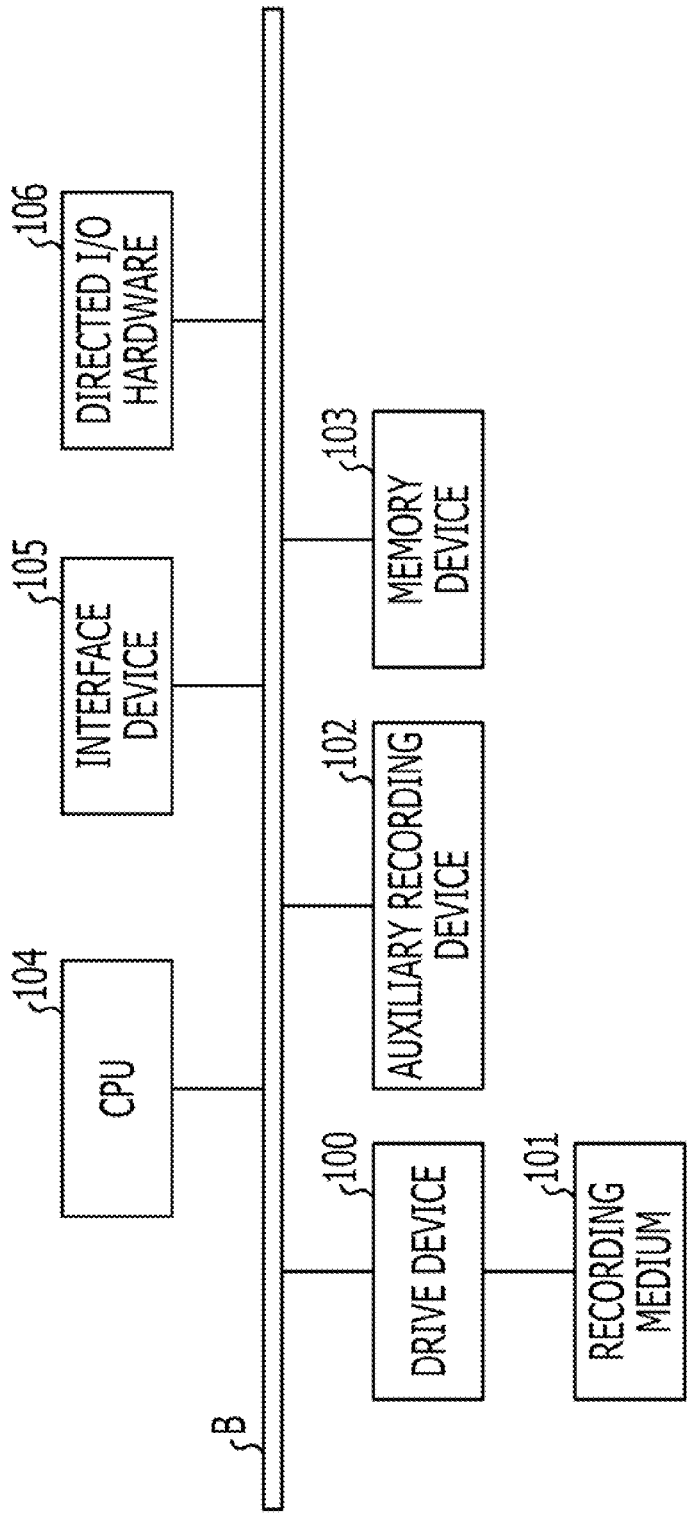
FIG. 4 illustrates a hardware configuration of a host computer according to an embodiment of the present invention.

FIG. 4 illustrates a hardware configuration of a host computer according to an embodiment of the present invention. The host computer 10 illustrated in FIG. 4 includes a drive device 100, an auxiliary storage device 102, a memory device 103, a CPU 104, an interface device 105, and directed I/O hardware 106 and the like, all of which are interconnected by a bus B.

Programs for implementing processing in the host computers 10 are provided by a recording medium 101 such as a CD-ROM and the like. When the recording medium 101 with recorded programs is inserted into the drive device 100, the programs are installed from the recording medium 101 to the auxiliary storage device 102 via the drive device 100. However, the installation of programs may not be carried out from the recording medium 101. Programs may also be downloaded from another computer via a network. The auxiliary storage device 102 stores installed programs as well as desired files and data and the like.

The memory device 103 reads out and stores the programs from the auxiliary storage device 102 when there is a program activation instruction. The CPU 104 carries out functions of the host computers 10 according to the programs stored in the memory device 103. The interface device 105 is used as an interface for connection to a network.

The directed I/O hardware 106 is hardware for implementing directed I/O. For example, the directed I/O hardware 106 carries out address conversion (DMA remapping) between a physical address in the host computer 10 (HPA: host-physical address) and a physical address recognized by a virtual machine (GPA: guest-physical address). That is, the host computers 10 can conduct direct memory access (DMA) between the virtual machine and the PCI device d using the directed I/O hardware 106. Hereinbelow, HPA refers to "host physical address" and GPA refers to "guest physical address."

Portable memory media such as a CD-ROM, a DVD disk, or a USB memory device and the like may be raised as examples of the recording medium 101. A hard disk drive (HDD) or a flash memory and the like are examples of the auxiliary storage device 102. Both the recording medium 101 and the auxiliary storage device 102 correspond to computer-readable recording media.

Figure 5:
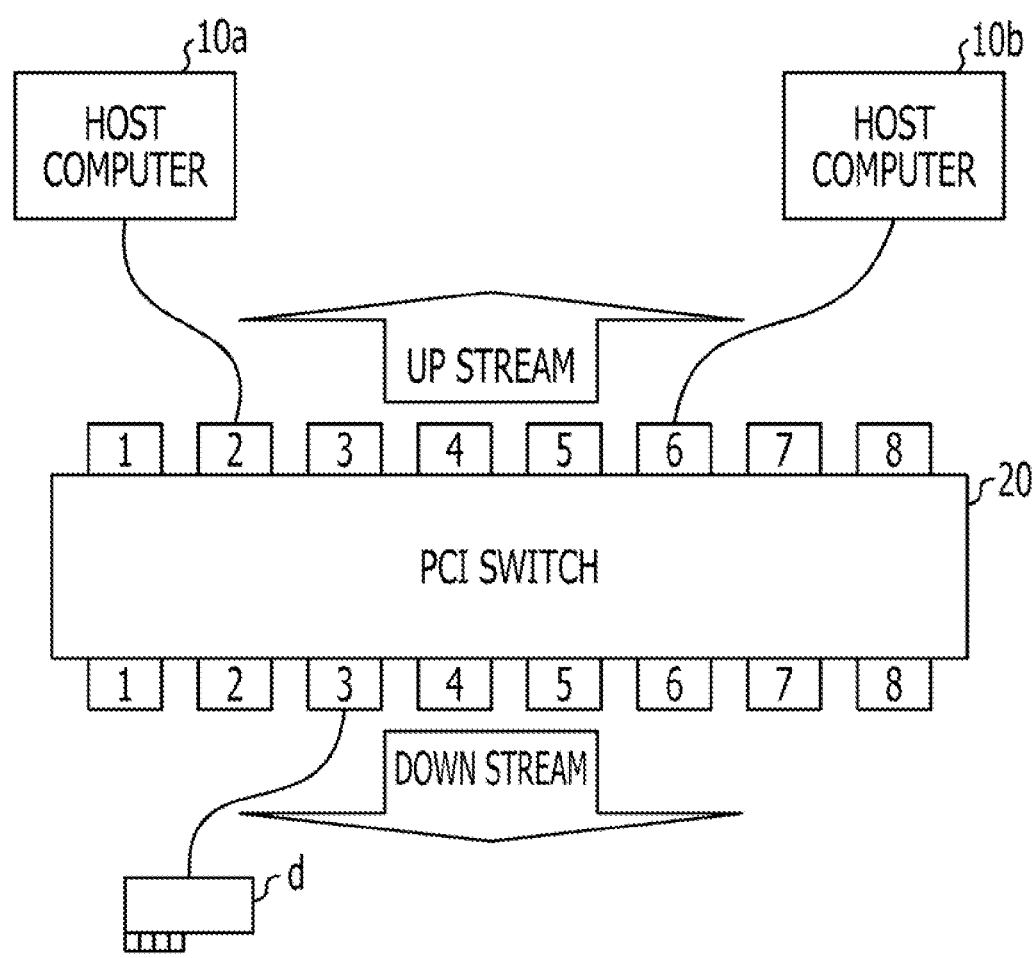
FIG. 5 describes a PCI switch according to an embodiment of the present invention.

FIG. 5 illustrates a PCI switch according to an embodiment of the present invention. In FIG. 5, the PCI switch 20 has multiple upstream ports (1 to 8) and multiple downstream ports (1 to 8). The downstream ports include ports connected to PCI devices d. The upstream ports include ports connected to the host computers 10.

The PCI switch 20 is equipped with a circuit that can change the connection relationships between the downstream ports and the upstream ports. The PCI switch 20 can switch the connection target host computer 10 of the PCI device d connected to the downstream port by changing the connection relationship between the downstream port and the upstream port.

Figure 6:
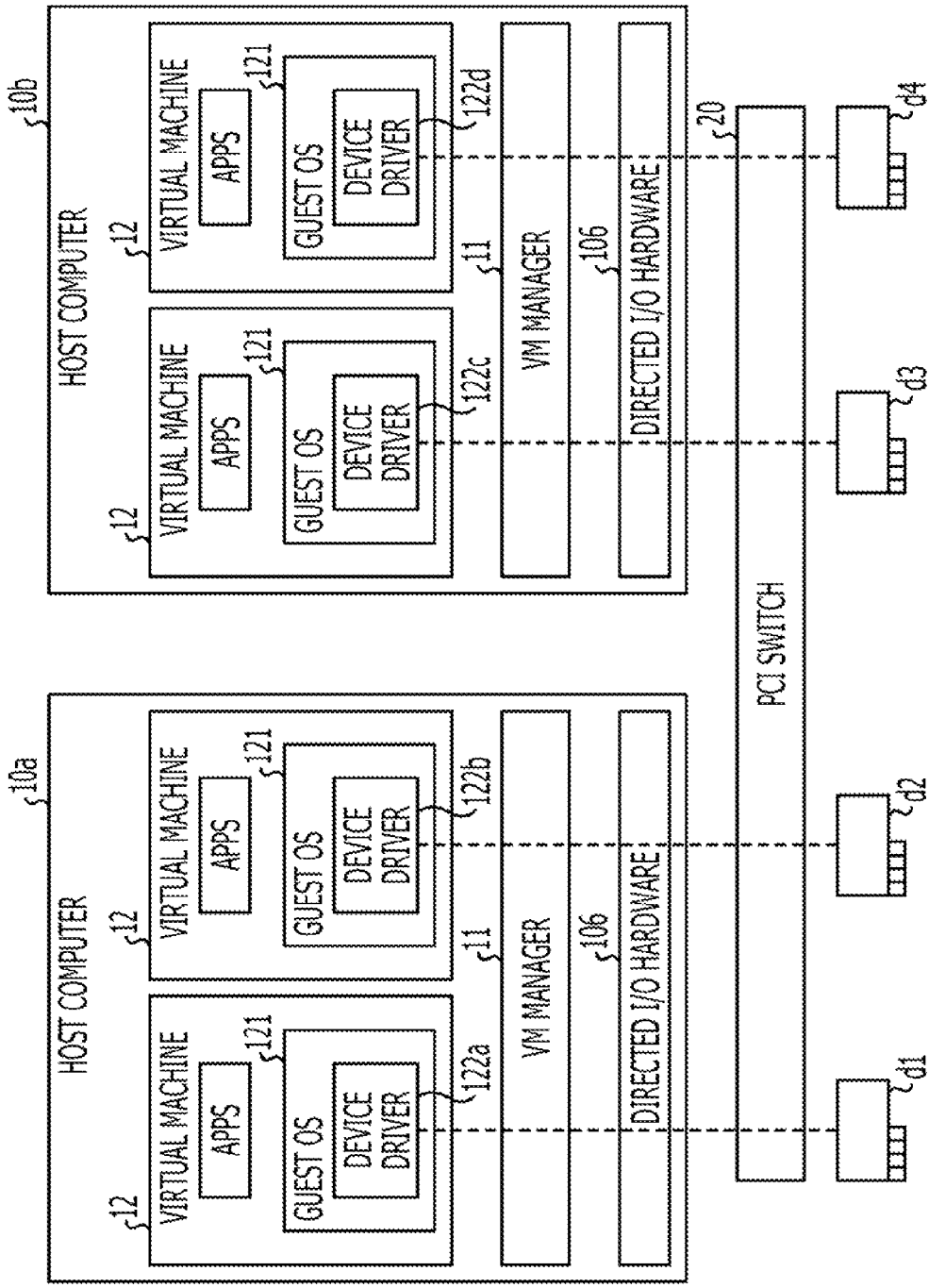
FIG. 6 illustrates a software configuration of a host computer according to an embodiment of the present invention.

FIG. 6 illustrates a software configuration of a host computer according to an embodiment of the present invention.

As illustrated in FIG. 6, software, such as a virtual machine (VM) manager 11 and one or more virtual machines 12, operates in the host computers 10. The software is implemented by programs that are installed in the host computers 10 and are executed through processing by the CPU 104.

The VM manager 11 is software that is called a virtual machine monitor or a hypervisor and the like. The VM manager 11 causes the virtual machine 12 to be activated based on a definition file of the virtual machine 12 and manages or monitors the operating state of the virtual machine 12. The virtual machine 12 definition file is a file in which configuration information related to the virtual machine 12 is described. According to the present embodiment, migration processing of the virtual machine 12 is carried out by the VM manager 11.

The virtual machine 12 is a virtual computer. One virtual machine 12 is handled in substantially the same way as one physical computer. For example, as illustrated in FIG. 6, an operating system (OS) can operate independently in each of the virtual machines 12. An OS operating on a virtual machine 12 is called a guest OS 121. All types of software can be operated on each guest OS 121 in substantially the same way as such software can normally operate on an OS operating on a computer. As illustrated in FIG. 6, various types of software are illustrated as apps. "App" is a short term for application program.

As illustrated in FIG. 4, directed I/O is implemented by the directed I/O hardware 106 in the host computers 10. Therefore, PCI devices d are directly allocated to each of the virtual machines 12. Accordingly, a device driver 122 dependent on a PCI device d used by the virtual machine 12 can be installed in each virtual machine 12.

For example, a device driver 122a is a device driver dependent on (corresponding to) a PCI device d1 as illustrated in FIG. 6. A device driver 122b is a device driver 122 dependent on a PCI device d2. A device driver 122c and a device driver 122d correspond to a PCI device d3 and a PCI device d4 respectively. The dotted lines linking the device drivers d122 and the PCI devices d represent correspondence relations. The virtual machines 12 can use the device drivers 122 installed in each guest OS 121 to directly drive each PCI device d using the directed I/O.

Figure 7:
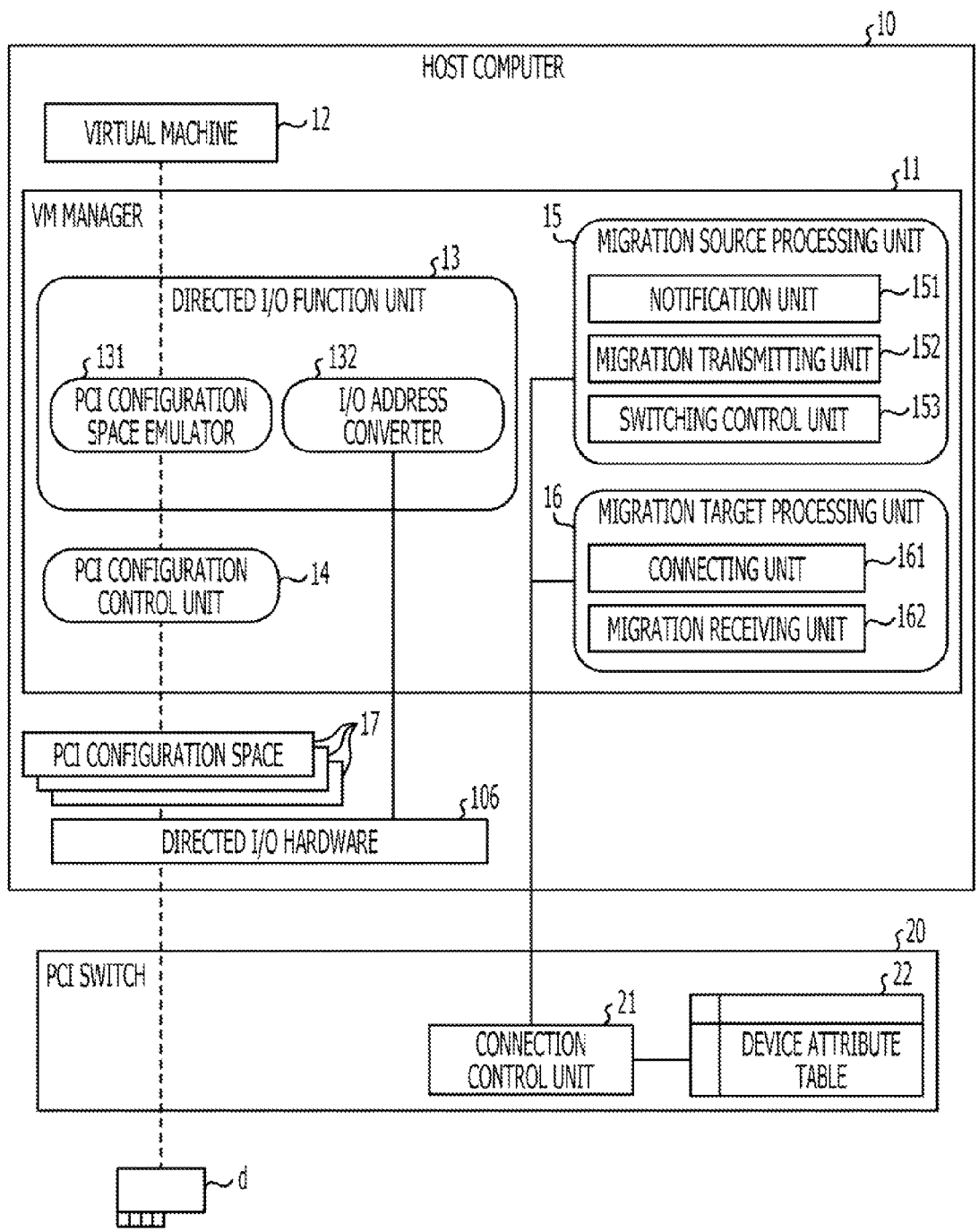
FIG. 7 describes a functional configuration of a VM manager according to an embodiment of the present invention.

FIG. 7 describes a functional configuration of a VM manager according to an embodiment of the present invention. In FIG. 7, the VM manager 11 includes a directed I/O function unit 13, a PCI configuration control unit 14, a migration source processing unit 15, and a migration target processing unit 16.

The directed I/O function unit 13 is a unit for implementing directed I/O using the directed I/O hardware 106. In FIG. 7, the directed I/O function unit 13 includes a PCI configuration space emulator 131 and an I/O address converter 132 and the like. The PCI configuration space emulator 131 conducts emulations for showing that the PCI device d is seemingly directly connected to the virtual machine 12. The I/O address converter 132 sets, in the directed I/O hardware 106, information desired for address conversions of the host physical address in the host computer 10 and the guest physical address of the virtual machine 12 when the corresponding virtual machine 12 is activated.

The PCI configuration control unit 14 controls a PCI configuration space 17 generated in the memory device 103 of the host computer 10. The PCI configuration control unit 14 controls the PCI device d in response to a request from the PCI configuration space emulator 131. The PCI configuration space 17 is a memory space for transparently allowing a PCI device register in the PCI device d to be operated. For example, when the contents of the PCI configuration space 17 are rewritten, the contents of a PCI configuration register in the PCI device d are rewritten by firmware (not illustrated).

The migration source processing unit 15 and the migration target processing unit 16 are paired and perform virtual machine 12 migration. The migration source processing unit 15 mainly operates in the virtual machine 12 migration source host computer 10. The migration target processing unit 16 mainly operates in the virtual machine 12 migration target host computer 10.

The migration source processing unit 15 includes a notification unit 151, a migration transmitting unit 152, and a switching control unit 153 and the like. The notification unit 151 mainly notifies (transfers), to the migration target host computer 10, information for connecting and permitting the use of PCI device d used before the migration by the migrated virtual machine 12 after the migration. For example, the notification unit 151 transfers MMIO region host physical address information of the migration source computer corresponding to the migrated virtual machine 12, to the migration target host computer 10. The migration transmitting unit 152 transfers memory images and the like of the migrated virtual machine 12 to the migration target host computer 10. The switching control unit 153 instructs the PCI switch 20 to switch the target of the PCI device d used by the migrated virtual machine 12 from the migration source host computer 10 to the migration target host computer 10.

The migration target processing unit 16 includes a connecting unit 161 and a migration receiving unit 162 and the like. The connecting unit 161 implements a process for permitting the use of the PCI device d used in the migration source by the migrated virtual machine 12 in the migration target. For example, the connecting unit 161 secures an MMIO region corresponding to the host physical address information in the migration target host computer 10 based on the MMIO region host physical address information transferred by the migration source notification unit 151. The migration receiving unit 162 receives the memory images and the like transferred from the migration transmitting unit 152 of the migration source host computer 10 to enable the virtual machine 12 in the migration target host computer 10 to be activated based on the received memory images.

The PCI switch 20 includes a connection control unit 21 and a device attribute table 22. The connection control unit 21 controls the connections between the PCI device d and the host computers 10. The connection control unit 21, for example, switches the PCI device d connection target host computer 10 in response to an instruction from the switching control unit 153. However, more specifically, the connection control unit 21 controls the connections of the downstream ports and the upstream ports.

The device attribute table 22 mainly controls attribute information of the PCI device d connected to the downstream ports. The attribute information includes items that indicate whether or not matching of the host physical address and the guest physical address related to the MMIO regions is necessary when the particular PCI device d is used by the virtual machine 12 with directed I/O. Some PCI devices d may not operate normally when the host physical address and the guest physical address related to the MMIO regions do not match when used with directed I/O.

Figure 8:
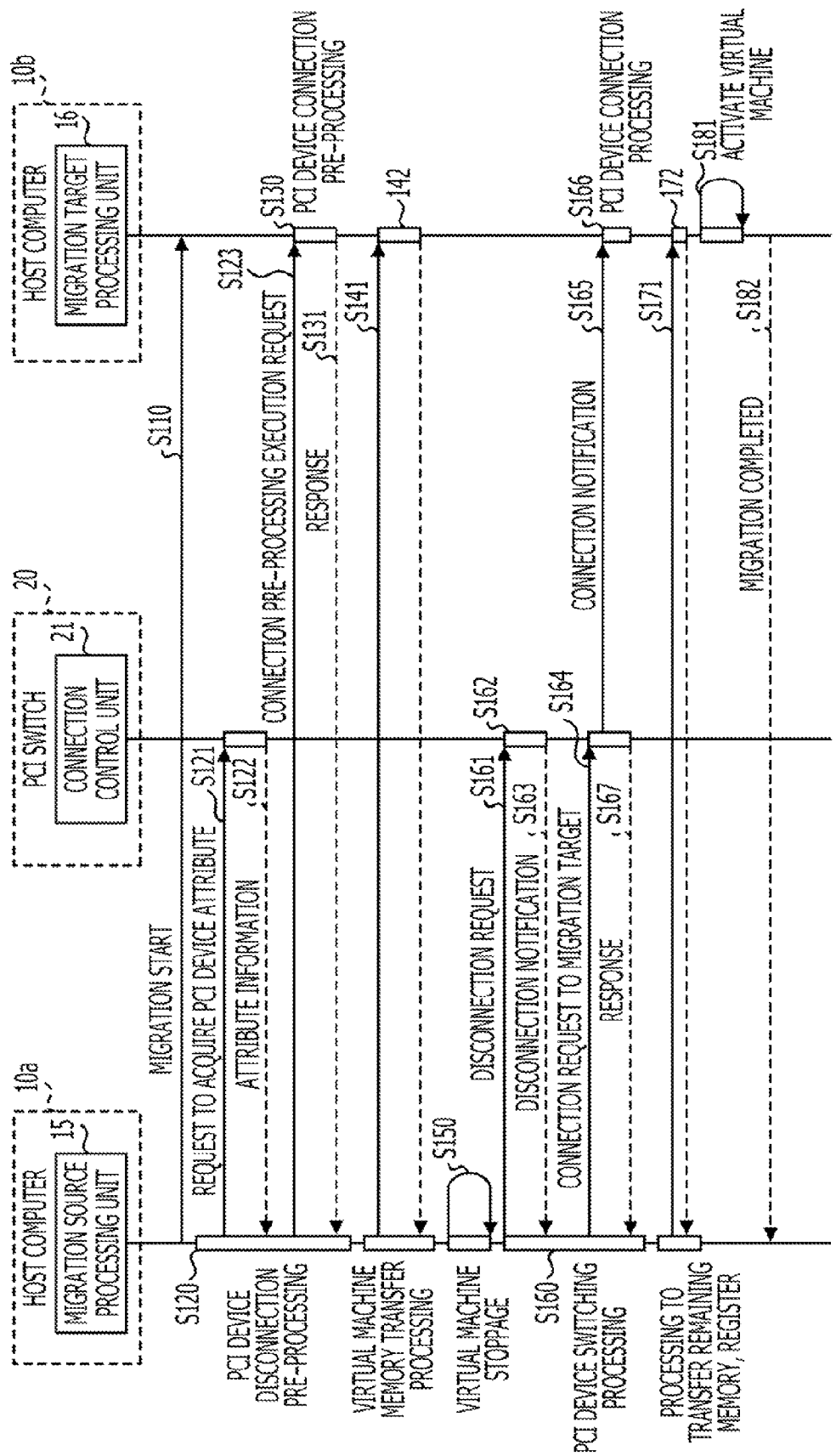
FIG. 8 is a sequence diagram describing an outline of virtual machine migration processing according to an embodiment of the present invention.

Hereinbelow, processing executed by the host computers 10 will be described. FIG. 8 is a sequence diagram describing an outline of virtual machine migration processing according to a first embodiment of the present invention. In FIG. 8, the host computer 10a is the migration source of the virtual machine 12. The host computer 10b is the migration target of the virtual machine 12.

For example, in response to an instruction to migrate the virtual machine 12 inputted by a user, the notification unit 151 of the migration source processing unit 15 in the host computer 10a sends a migration start notification to the migration target processing unit 16 of the migration target host computer 10b through the network 30 (S110). An outline of the virtual machine 12 subject to migration is also indicated in the migration start notification. For example, the usage memory amount of the virtual machine 12 and information recorded in the virtual machine 12 definition file and the like are included in the notification. The migration receiving unit 162 of the migration target processing unit 16 in the migration target host computer 10b creates an empty virtual machine 12 in a memory space based on the information indicated with the start notification in response to the reception of the migration start notification.

The virtual machine 12 migration instruction may also be inputted through a graphical user interface (GUI), or inputted by a command line on a console screen. In any case, the virtual machine 12 subject to migration and the migration target host computer 10 are specified. The migration instruction may be inputted in the host computer 10a or in another computer (not illustrated) connected to the host computer 10a via a network.

Next, the notification unit 151 conducts disconnection pre-processing of the PCI device d used by the virtual machine 12 subject to migration (S120). In this pre-processing, the notification unit 151 sends an acquisition request to acquire attribute information of the applicable PCI device d to the connection control unit 21 of the PCI switch 20 (S121). The connection control unit 21 acquires the PCI device d attribute information from the device attribute table 22 and sends the information back to the notification unit 151 (S122). The notification unit 151 specifies the attribute information and the MMIO region host physical address information of the PCI device d, and then sends, to the migration target processing unit 16 of the host computer 10b via the network 30, an execution request to execute connection pre-processing (S123). The connecting unit 161 of the migration target processing unit 16 executes the connection pre-processing of the PCI device d (S130). The PCI device d connection pre-processing involves preparation procedures for connecting the PCI device d to the migration target of the virtual machine 12. Connection pre-processing of the PCI device d is explained in detail below. When the connection pre-processing is completed, the connecting unit 161 sends a response to the notification unit 151 (S131).

Next, the migration transmitting unit 152 of the migration source processing unit 15 transfers the memory images of the operating virtual machine 12 subject to migration, to the migration target processing unit 16 via the network 30 (S141). The migration receiving unit 162 of the migration target processing unit 16 writes the received memory images into the virtual machine 12 in the space created in step S110 (S142). Steps S141 and S142 are repeated a number of times. Moreover, the migration transmitting unit 152 uses the memory device 103 of the host computer 10a to store portions of the memory images of the virtual machine to be migrated changed during the transfer. This is because, since the virtual machine 12 subject to migration is operating, some of the memory images may have been updated during the transfer of the memory images.

When the remaining amount of the memory images to be transferred reaches or falls below a certain amount, the migration transmitting unit 152 stops the virtual machine to be migrated (S150). The migration transmitting unit 152 deactivates the settings related to the directed I/O for the stopped virtual machine 12. The deactivation of the settings related to the directed I/O refers to releasing a table (hereinbelow referred to as "address conversion table") for converting the guest physical address of the virtual machine 12 and the host physical address of the host computer 10a set by the directed I/O hardware 106. For example, the migration transmitting unit 152 specifies a VMID of the stopped virtual machine 12 and sends a request to the I/O address converter 132 to deactivate the directed I/O settings. The I/O address converter 132 causes the directed I/O hardware 106 to release the address conversion table related to the specified VMID.

Next, the switching control unit 153 of the migration source processing unit 15 performs connection target switching processing of the PCI device d used by the virtual machine 12 subject to migration (S160). Specifically, the switching control unit 153 sends a disconnection request to the connection control unit 21 of the PCI switch 20 through the network 30 in relation to the PCI device d used by the virtual machine 12 subject to migration (S161). In response to the disconnection request, the connection control unit 21 disconnects the connection to the host computer 10a related to the PCI device d (S162). Next, the connection control unit 21 sends, to the host computer 10a, a notification (disconnection notification) indicating the disconnection (unplugging) of the PCI device d (S163). The disconnection notification is transferred via a cable that connects the upstream port of the PCI device d and the host computer 10a. Therefore, the host computer 10a receives the corresponding disconnection notification through a PCI slot connected to the corresponding cable. In response to the disconnection notification, release and the like of PCI device d configuration spaces for the corresponding PCI device d is conducted in the host computer 10a.

Next, the switching control unit 153 sends a connection request to request connection of the corresponding PCI device d to the host computer 10b, to the connection control unit 21 of the PCI switch 20 (S164). In response to the connection request, the connection control unit 21 connects the corresponding PCI device d to the host computer 10b. The connection control unit 21 sends, to the host computer 10b, a notification (connection notification) indicating that the corresponding PCI device d is connected (hot plug) (S165). The connection notification is transferred via a cable that connects the upstream port of the PCI device d and the host computer 10b. Therefore, the host computer 10b receives the corresponding connection notification through a PCI slot connected to the corresponding cable. The connecting unit 161 of the migration target processing unit 16 executes the connection processing of the PCI device d in response to the connection notification (S166). Next, the connection control unit 21 sends, to the switching control unit 153, a response indicating the success or failure of the connection processing (S167).

Next, the migration transmitting unit 152 of the migration source processing unit 15 transfers the remaining memory images and the contents of the register of the CPU 104 and the like to the migration target processing unit 16 (S171). The remaining memory images include portions of the memory images not transferred in step S141 and portions of the memory images transferred in step S141 that were updated afterward and the like. The migration receiving unit 162 of the migration target processing unit 16 updates the virtual machine 12 memory images previously written in the memory space, based on the received data (S172).

Next, the migration receiving unit 162 conducts the directed I/O settings related to the migrated virtual machine 12 based on the updated memory images, and causes the host computer 10b to activate the corresponding virtual machine 12 (S181). Conducting the directed I/O settings refers to making an address conversion table for the object virtual machine 12 for the directed I/O hardware 106 settings. If the virtual machine 12 is activated normally, the migration receiving unit 162 sends a migration completed notification to the migration source processing unit 15 (S182).

The steps S141, S142, S150 and steps S171 to S182 may be conducted according to known techniques related to the live migration of the virtual machine 12.

Figure 9:
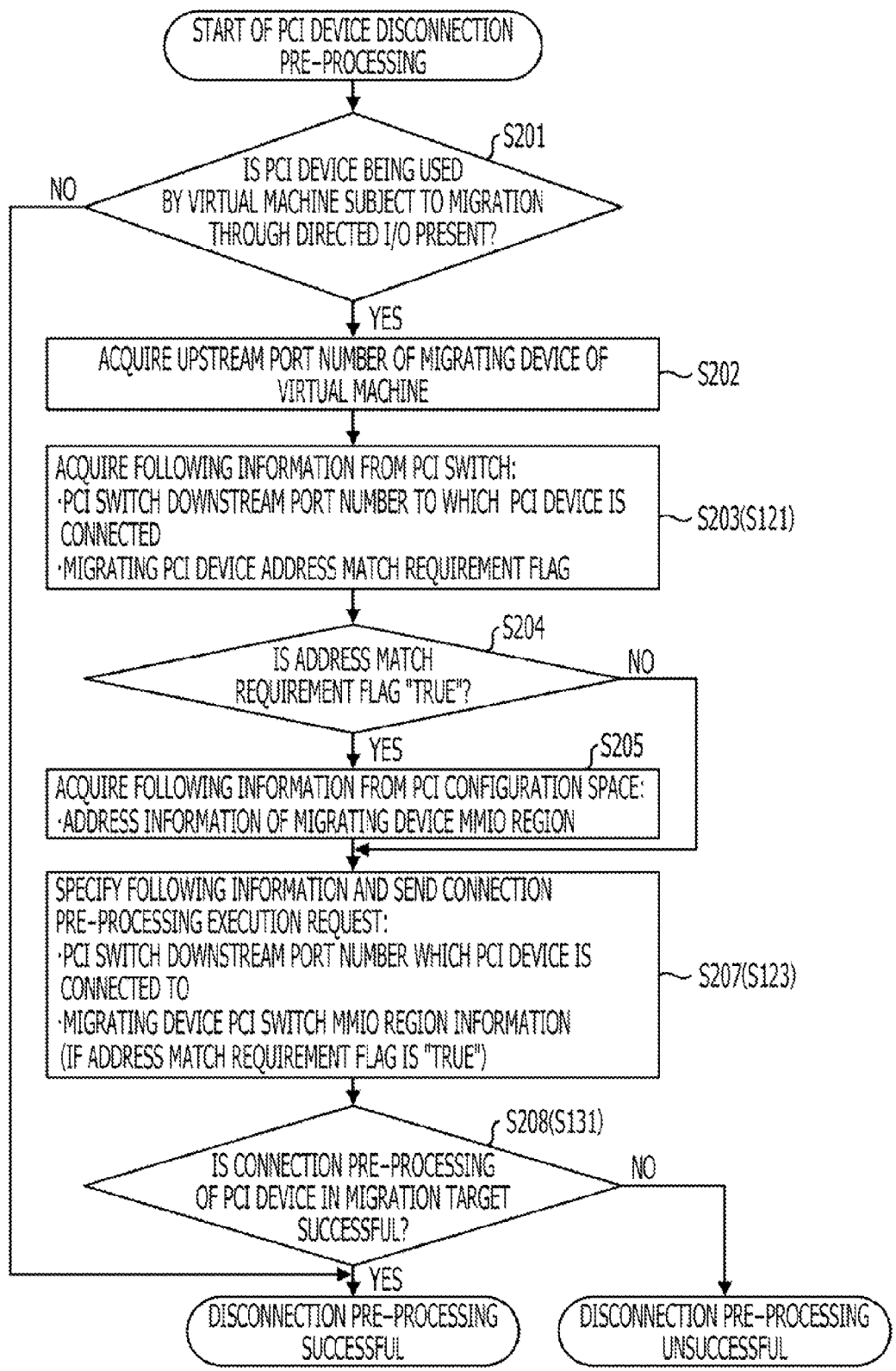
FIG. 9 is a flowchart of exemplary procedures for disconnection pre-processing of a PCI device activated by a migration source host computer according to a first embodiment.

The following is a detailed description of the step S120. FIG. 9 is a flowchart of exemplary procedures for PCI device disconnection pre-processing executed by the migration source host computer according to a first embodiment. Numbers in parentheses in FIG. 9 correspond to the step numbers illustrated in FIG. 8.

In step S201, the notification unit 151 checks for the presence of a PCI device d (hereinbelow referred to as "migrating device") being used through directed I/O by the virtual machine 12 subject to migration. More specifically, the notification unit 151 specifies an identifier (hereinafter referred to as "VMID") of the virtual machine 12 subject to migration and refers to a list of the PCI devices d being used through directed I/O by the virtual machine 12 related to the corresponding VMID. The I/O address converter 132 extracts a record corresponding to the specified VMID from a directed I/O device list table t1 that manages itself by using the memory device 103, in response to the above referral.

FIG. 10 illustrates a configuration example of a directed I/O device list table. As illustrated in FIG. 10, the directed I/O device list table t1 stores, in the host computer 10a, a BDF number, a VMID, a PCI slot number, and an upstream port number and the like for each PCI device d used through the directed I/O.

The BDF number is identification information of each PCI device d related to the host computer 10a. "B" indicates "bus," "D" indicates "device," and "F" indicates "function." The BDF number may be different for each host computer 10 even with the same PCI device d.

The VMID is an identifier (virtual machine ID) of the virtual machine 12 using, through directed I/O, the PCI device d corresponding to the BDF number. The PCI slot number is an identifier of a virtual PCI slot in which the PCI device d related to the BDF number is connected to the virtual machine 12 corresponding to the VMID. The upstream port number is a number of an upstream port used for connecting the PCI device d corresponding to the BDF number to the PCI switch 20.

In the above step S201, the I/O address converter 132 extracts, from the directed I/O device list table, records including the VMID specified in the referral by the notification unit 151 and sends the extracted records to the notification unit 151. A list of the records is a list of the records corresponding to the migrating devices. When there are more than one corresponding records, each record (that is, each migrating device) is executed from step S202. The following will describe one migrating device for the sake of convenience in the present embodiment.

Next, the notification unit 151 acquires the upstream port number from the extracted record (S202). The association of the BDF number and the upstream port number may not be managed by an address converter (in the directed I/O device list table t1). In this case, the BDF number may be acquired from the extracted record in step S202. The notification unit 151 may acquire the upstream port number corresponding to the applicable BDF number from a separately managed correspondence table of the BDF number and the upstream port number.

Next, the notification unit 151 specifies the acquired upstream port number and requests the connection control unit 21 of the PCI switch 20 to acquire the attribute information of the PCI device d corresponding to the upstream port number (S203).

The connection control unit 21 that receives the request acquires the attribute information of the PCI device d corresponding to the specified upstream port number from the device attribute table 22. The connection control unit 21 sends the acquired attribute information back to the notification unit 151.

FIG. 11 illustrates a configuration example of a device attribute table. As illustrated in FIG. 11, the device attribute table 22 stores a downstream port number, the upstream port number, a vendor ID, a device ID, and an address match requirement flag and the like for each downstream port of the PCI switch 20.

The downstream port number is a PCI switch 20 port number of the downstream port. The upstream port number is the port number of the upstream port connected to the downstream port corresponding to the downstream port number. That is, the downstream port/upstream port connection relationship is indicated by the combination of the downstream port number and the upstream port number.

The vendor ID is a vendor identifier of the PCI device d connected to the downstream port corresponding to the downstream port number. The device ID is an identifier of the PCI device d connected to the downstream port corresponding to the downstream port number.

The address match requirement flag is information indicating whether matching of the host physical address and the guest physical address related to the MMIO region is necessary or not for the PCI device d connected to the downstream port number. "False" indicates that matching is not required. "True" indicates that matching is required.

The vendor ID and the device ID are acquired by the connection control unit 21 from the applicable PCI device d when, for example, the PCI device d is connected to a downstream port of the PCI switch 20. The address match requirement flag is set, for example, through a control screen of the PCI switch 20. The control screen of the PCI switch 20 is a screen, for example, displayed on a computer connected to the PCI switch 20 via the network 30.

Additionally, the upstream port number can be updated according to an instruction by the switching control unit 153 in the virtual machine 12 migration process as described below, if the upstream port number can also be set via the above control screen.

In the abovementioned step S203, the connection control unit 21 sends the downstream port number and the address match requirement flag and the like corresponding to the upstream port number specified in the request from the notification unit 151.

Next, the notification unit 151 determines whether the value of the address match requirement flag acquired in relation to the migrating device is "true" or not (S204). Specifically, the migrating device is checked to determine whether or not matching of the guest physical address and the host physical address related to the MMIO region is required when using directed I/O.

When the migrating device address match requirement flag is "true" (S204 Yes), the notification unit 151 acquires the host physical address information of the MMIO region of the migrating device (S205). More specifically, the notification unit 151 specifies the BDF number of the migrating device and requests the PCI configuration control unit 14 to acquire a PCI configuration space 17. The PCI configuration control unit 14 sends the PCI configuration space 17 corresponding to the specified BDF number back to the notification unit 151. Specifically, the PCI configuration control unit 14 manages the PCI configuration space 17 in association with the BDF number. The notification unit 151 acquires the MMIO region host physical address information (hereinbelow referred to as "MMIO region information") of the migrating device from a base address register included as a portion of the returned PCI configuration space 17.

Figure 12:
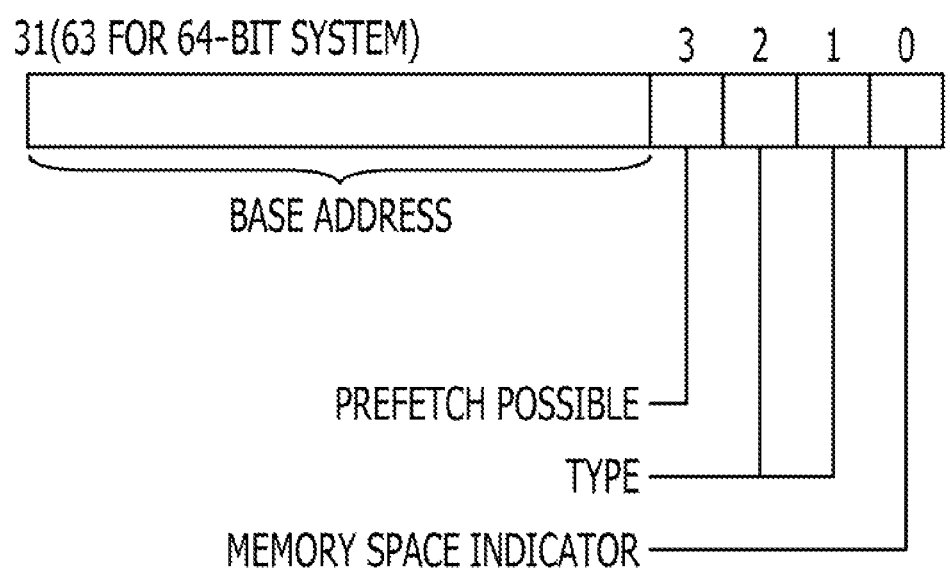
FIG. 12 illustrates an example of a base address register.

FIG. 12 is a configuration example of a base address register. As illustrated in FIG. 12, the base address register includes a base address field, a prefetch possible field, a type field, and a memory space indicator field and the like.

A starting address and the size of the MMIO region host physical address space are recorded in the base address field. Therefore, the MMIO region starting address and the size are acquired in step S205 as MMIO region information from the base address field of the base address register.

Explanations of the prefetch possible field, the type field, and the memory space indicator field will be omitted.

If step S204 is No or continuing from step S205, the notification unit 151 sends an execution request to execute the connection pre-processing related to the migrating device, to the migration target processing unit 16 of the migrating target host computer 10b (S207). The downstream port number of the downstream port connecting the migrating device to the PCI switch 20 is specified in the request. The applicable downstream port number is the value acquired in step S203. Moreover, when the address match requirement flag of the migrating device is "true," the MMIO region information (MMIO region starting address and size) of the migrating device is also specified in the request.

In the present embodiment, the fact that matching of the guest physical address and the host physical address related to the MMIO region of the migrating device is necessary is communicated to the migration target by specifying the MMIO region information in the connection pre-processing execution request. However, the migrating device MMIO region information may be specified every time in the connection pre-processing execution request. In this case, the fact that matching of the guest physical address and the host physical address related to the MMIO region of the migrating device is necessary may be communicated to the migration target through the specification of the address match requirement flag corresponding to the migrating device in the connection pre-processing execution request. Conversely, the address match requirement flag may not be specified. This is because the address match requirement flag of the migrating device can be acquired based on the downstream port number in the migration target. Specifically, the necessity of matching the guest physical address and the host physical address related to the MMIO region of the migrating device may not necessarily be explicitly communicated to the migration target from the migration source.

Next, the notification unit 151 determines the success or failure of the connection pre-processing in the migration target host computer 10b based on the response from the migration target processing unit 16 (S208). When a response indicating the success of the connection pre-processing is received (S208, Yes), the notification unit 151 determines that the disconnection pre-processing of the migrating device is successful. When a response indicating the failure of the connection pre-processing is received (S208, No), the notification unit 151 determines that the disconnection pre-processing of the migrating device failed. In this case, the processing for the migration of the virtual machine 12 is terminated.

Figure 13:
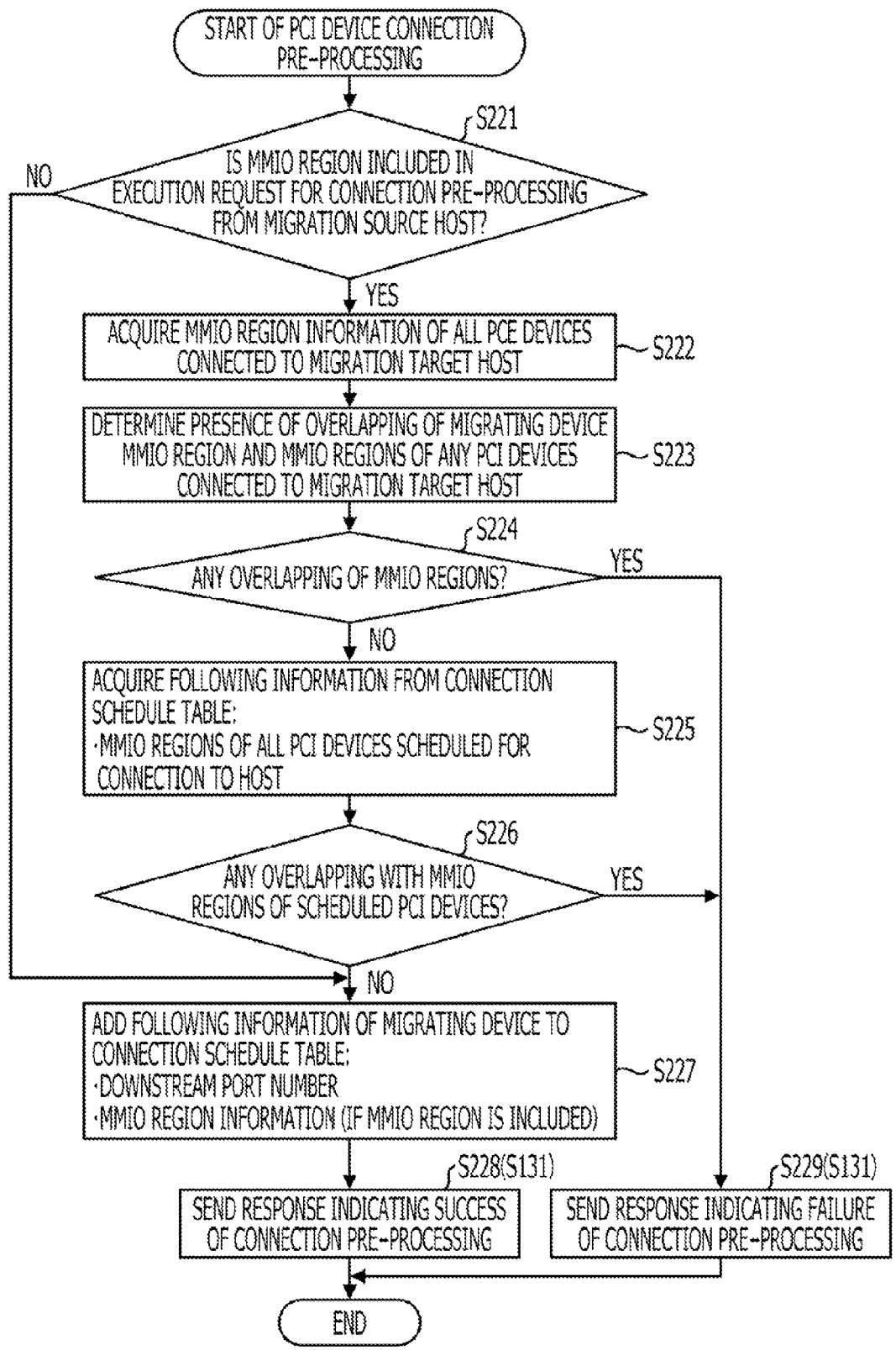
FIG. 13 is a flowchart of procedures for PCI device connection pre-processing executed by a migration target host computer according to the first embodiment.

The following is a detailed description of the step S130 in FIG. 8. FIG. 13 is a flowchart describing exemplary procedures for connection pre-processing of a PCI device activated by a migration target host computer according to the first embodiment. Numbers in parentheses in FIG. 13 correspond to step numbers illustrated in FIG. 8.

In step S221, the connecting unit 161 of the migration target processing unit 16 in the migration target host computer 10b determines whether the migrating device MMIO region information is included in the connection pre-processing execution request sent by the notification unit 151 of the migration source host computer 10a. Specifically, the necessity of matching the guest physical address and the host physical address related to the MMIO region of the migrating device scheduled to be connected is determined.

Next, the connecting unit 161 acquires the MMIO region information of all the PCI devices d connected to the host computer 10b (S222). More specifically, the connecting unit 161 makes a request, to the PCI configuration control unit 14, for the PCI configuration spaces 17 corresponding to each of the BDF numbers of all the applicable PCI devices d. The PCI configuration control unit 14 sends the PCI configuration spaces 17 corresponding to the specified BDF numbers to the connecting unit 161. The connecting unit 161 acquires the MMIO region information of the PCI devices d connected to the host computer 10b from the base address registers included in the returned PCI configuration spaces 17. In this step, the migrating device is not yet connected to the migration target host computer 10b. Therefore, the migrating device is not included in the applicable PCI devices d.

Next, the connecting unit 161 determines whether there is any overlapping between the migrating device MMIO region and the MMIO regions of any PCI devices d already connected to the host computer 10b (S223). This determination is carried out by using the migrating device MMIO region information included in the connection pre-processing execution request, and the MMIO region information acquired in step S222. In the present embodiment, "overlapping of the MMIO regions" refers to overlapping of at least a part of the MMIO regions. That is, overlapping portions of the MMIO regions being compared are present.

When no overlapping is detected among the compared MMIO regions (S224: No), the connecting unit 161 acquires the MMIO region information of all the PCI devices d scheduled to be connected to the host computer 10b from a connection schedule table t2 (S225). PCI devices d that are scheduled to be connected to the host computer 10b are devices that are not currently connected, but are scheduled to be connected accompanying the migration of the virtual machine 12 such as the migrating devices described in the present embodiment.

FIG. 14 is an exemplary configuration of a connection schedule table. As illustrated in FIG. 14, the connection schedule table t2 stores a downstream port number, a starting address, and a size and the like for each PCI device d scheduled to be connected. The downstream port number is a port number of the downstream port connecting the applicable PCI device d to the PCI switch 20. The starting address is the MMIO region starting address (host physical address) of the applicable PCI device d in the migration target host computer 10b. The size refers to the size of the applicable MMIO region. The connection schedule table t2 is created, for example, in the memory device 103 of the host computer 10b. The connection schedule table t2 is an example of a reservation information storing unit according to the present embodiment.

In the abovementioned step S225, all the records of the starting addresses and sizes recorded in the connection schedule table t2 are acquired as MMIO region information.

Next, the connecting unit 161 determines whether there is any overlapping between the migrating device MMIO region and the MMIO regions scheduled to be connected to the host computer 10b (S226). This determination is carried out by using the migrating device MMIO region information included in the connection pre-processing execution request, and the MMIO region information acquired in step S225.

Specifically, the migration of multiple virtual machines 12 on one host computer 10 or on multiple host computers 10 to one host computer 10 may be conducted in parallel. Therefore, even if the overlapping of MMIO regions between PCI devices d connected to the applicable host computer 10 at the present point in time is not detected with respect to the migrating device, the overlapping of MMIO regions between the migrating device and other migrating devices migrating concurrently may be generated. Step S226 involves determination to avoid the generation of such overlapping.

If overlapping of the MMIO regions between the migrating device and the scheduled PCI device d is not detected (S226, No), or if step S221 is No, the connecting unit 161 adds the migrating device information to the connection schedule table t2 (S227). Specifically, a record including the downstream port number related to the migrating device is added to the connection schedule table t2. Additionally, the starting address and size of the migrating device is added to the applicable record when the MMIO region information of the migrating device is included in the connection pre-processing execution request. As a result, the connection of the migrating device is scheduled in the migration target host computer 10b.

Next, the connecting unit 161 sends a response back to the notification unit 151 of the migration source host computer 10a indicating the success of the migrating device connection pre-processing (S228).

Conversely, if step S224 or step S226 is Yes, the connecting unit 161 sends a response back to the notification unit 151 of the migration source host computer 10a indicating the failure of the migrating device connection pre-processing (S229). When step S224 or step S226 are Yes, overlapping between the migrating device MMIO region and an MMIO region of the PCI device d scheduled to be connected or already connected to the host computer 10b is detected.

Figure 15:
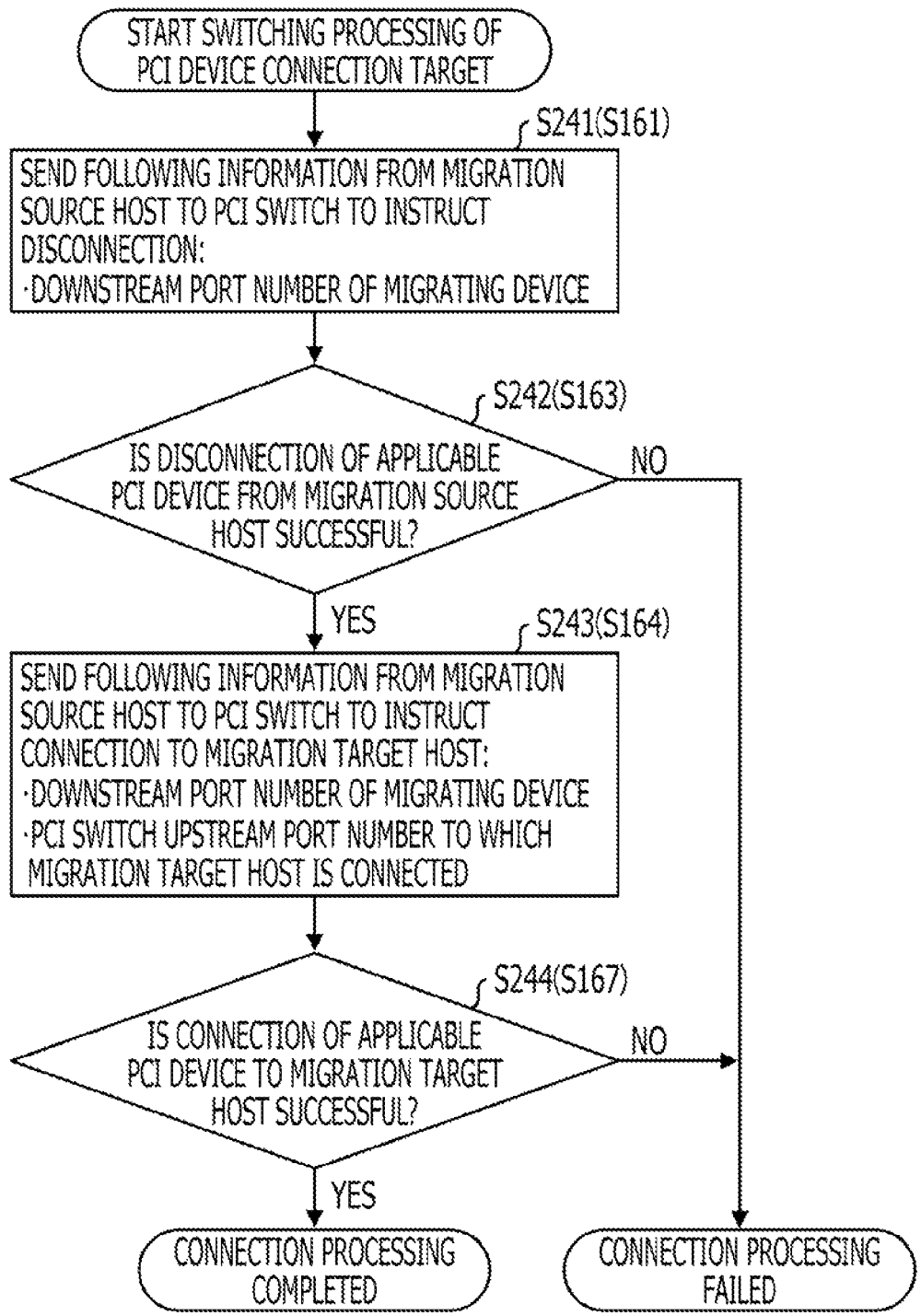
FIG. 15 is a flowchart of exemplary procedures for switching processing of a PCI device connection target executed by a migration source host computer according to a first embodiment.

The following is a detailed description of the step S160 in FIG. 8. FIG. 15 is a flowchart of exemplary procedures for switching processing of a PCI device connection target executed by a migration source host computer according to a first embodiment. Numbers in parentheses in FIG. 15 correspond to step numbers illustrated in FIG. 8.

In step S241, the switching control unit 153 specifies the downstream port number of the migrating device and sends a migrating device disconnection request to the connection control unit 21 of the PCI switch 20. The corresponding downstream port number to be used may be the one acquired in step S203 in FIG. 9. In response to the disconnection request, the connection between the downstream port corresponding to the specified downstream port number and the upstream port connected thereto is disconnected (deactivated). The migration source host computer 10a is connected to the upstream port. Therefore, the connection between the migrating device and the host computer 10a is disconnected. As a result, the upstream port number corresponding to the downstream port number is removed from the device attribute table 22.

Next, the switching control unit 153 determines the success or failure of the disconnection according to the response from the connection control unit 21 (S242). When the disconnection is successful (S242, Yes), the switching control unit 153 sends a connection request to connect the migrating device to the migration target host computer 10b, to the connection control unit 21 of the PCI switch 20 (S243). The downstream port number of the migrating device and the upstream port number of the PCI switch 20 connected to the host computer 10b are specified in the connection request. The upstream port number is assumed to be already known in the host computer 10a. For example, the applicable upstream port number is previously set in the host computer 10a by an administrator or the like.

In response to the connection request, the connection between the downstream port corresponding to the specified downstream port number and the upstream port corresponding to the specified upstream port number is made in the PCI switch 20. The migration target host computer 10b is connected to the upstream port. Therefore, the migrating device is connected to the host computer 10b. As a result, the upstream port number corresponding to the downstream port number is recorded in the device attribute table 22.

Next, the switching control unit 153 determines the success or failure of the connection according to the response from the connection control unit 21 (S244). If the connection has failed (S224: No), the migration processing is terminated.

Figure 16:
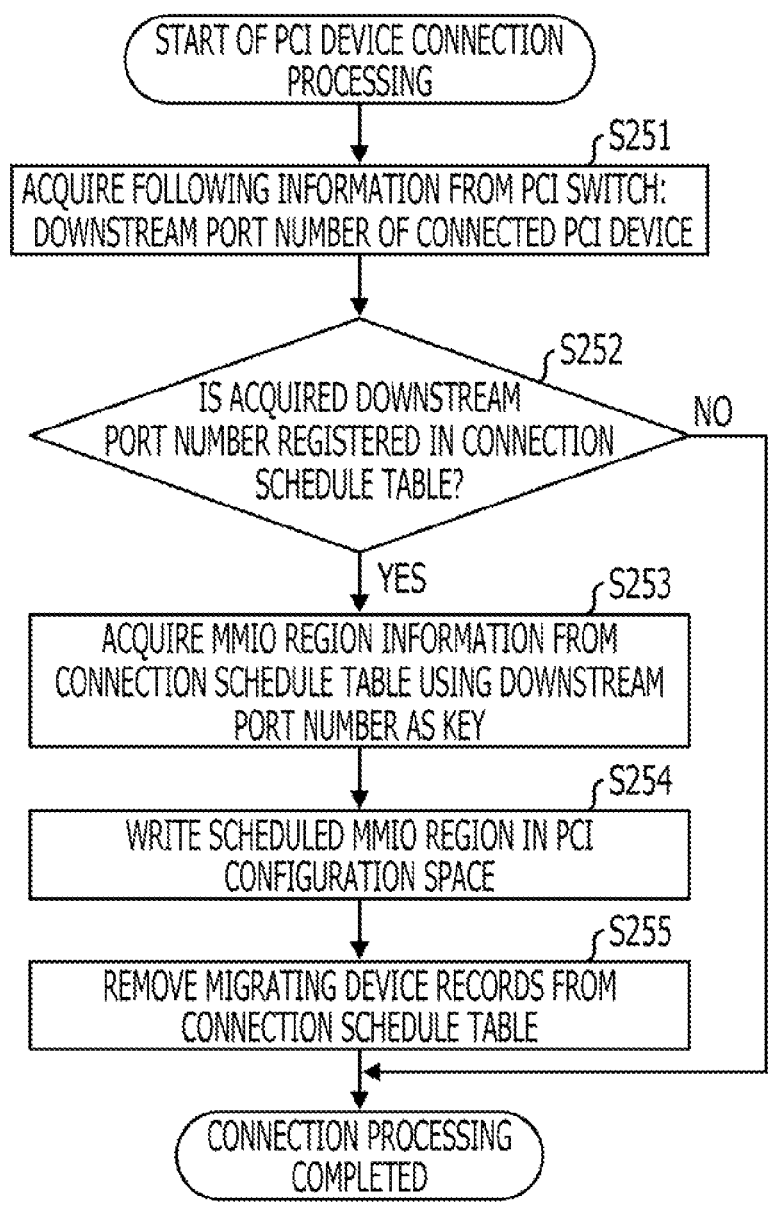
FIG. 16 is a flowchart of exemplary procedures for PCI device connection processing executed by the migration target host computer according to the first embodiment.

The following is a detailed description of step S166 in FIG. 8. FIG. 16 is a flowchart describing exemplary procedures for PCI device connection processing executed by the migration target host computer according to the first embodiment.

In response to the PCI device d connection notification, the connecting unit 161 of the migration target processing unit 16 acquires the downstream port number of the PCI device d corresponding to the connection notification from the connection control unit 21 of the PCI switch 20 (S251). Next, the connecting unit 161 determines whether or not the acquired downstream port number is recorded in the connection schedule table t2 (see FIG. 14) (S252). Specifically, it is determined whether or not the PCI device d corresponding to the connection notification is a migrating device. The PCI device d connection notification from the PCI switch 20 is not necessarily conducted only upon the migration of the virtual machine 12. Also, if multiple PCI devices d are subject to migration, it is preferable to differentiate which PCI device d connection notification corresponds to which reservation.

If the downstream port number is registered in the connection schedule table t2 (S252: Yes), the connecting unit 161 acquires the MMIO region information from the connection schedule table t2 using the downstream port number as a key (S253). Specifically, the starting address and size associated with the downstream port number in the connection schedule table t2 are acquired (S253).

Next, the connecting unit 161 writes the MMIO region information acquired in step S253 in the base address register of the PCI configuration space 17 corresponding to the migrating device according to the connection notification (S254). The PCI configuration space 17 corresponding to the migrating device according to the connection notification is acquired by the PCI configuration control unit 14 based on the BDF number of the migrating device. The BDF number is identified based on the PCI slot or the like received in the connection notification in the host computer 10b.

The PCI configuration space 17 corresponding to the migrating device according to the connection notification is generated by Basic Input/Output System (BIOS) firmware and the like of the host computer 10b in response to the connection notification. A base address register value at the time of the generation of the PCI configuration space 17 is automatically set, for example, to avoid overlapping with an MMIO region of another PCI device d connected to the host computer 10b. In step S254, the automatically set value is updated according to the MMIO region information (starting address and size) acquired in step S253. Specifically, a host physical address MMIO region that is the same as the MMIO region in the migration source is allocated in the migration target host computer 10b to the migrating device. This indicates that the guest physical address of the virtual machine 12 subject to migration and the host physical address in the host computer 10b corresponding to the migrating device MMIO region match. This is because the migration of the applicable virtual machine 12 is conducted while the guest physical address of the MMIO region corresponding to the migrating device is kept as the same value as before the migration.

In response to the rewriting of the contents of the PCI configuration space 17 base address register, the PCI device d MMIO region corresponding to the PCI configuration space 17 is actually transferred by a bus bridge of the host computer 10b.

Next, the connecting unit 161 removes the record related to the downstream port number acquired in step S251 from the connection schedule table t2 (S255). This is because the scheduled MMIO region is actually allocated. The record corresponding to the downstream port number is the record corresponding to the migrating device.

Conversely, when the downstream port number acquired in step S251 is not registered in the connection schedule table t2 (S252: No), the processing from step S253 is not conducted. This is because the PCI device d corresponding to the connection notification is not switched to the connection target accompanying the migration of the virtual machine 12.

As described above according to the first embodiment, the MMIO region host physical address of the PCI device d used by the applicable virtual machine 12 is communicated to the migration target host computer 10b by the virtual machine 12 migration source host computer 10a. The host computer 10b allocates the communicated host physical address information to the applicable PCI device d. Therefore, the guest physical address and the host physical address of the applicable PCI device d MMIO region can be matched in the migration target. As a result, the migrated virtual machine 12 can use the PCI device d used in the host computer 10a through directed I/O continuously in the migration target.

The address match requirement flag for each PCI device d may not necessarily be stored in the PCI switch 20, and instead may be stored in another computer. For example, the address match requirement flag for each PCI device d may be stored in each of the host computers 10 or in any one of the host computers 10. Moreover, the address match requirement flag for each PCI device d may be stored in a control server that controls the host computers 10. In any of the above cases, the computer storing the address match requirement flag for each PCI device d is an example of a device information storage unit according to the present embodiment.

The following is an explanation of a second embodiment. Items of the second embodiment that differ from the first embodiment will be described. Thus, items that are not mentioned in particular are the same as those described in the first embodiment. In the second embodiment, a portion of the PCI device d connection pre-processing conducted by the migration target host computer 10b is different from the first embodiment.

Figure 17:
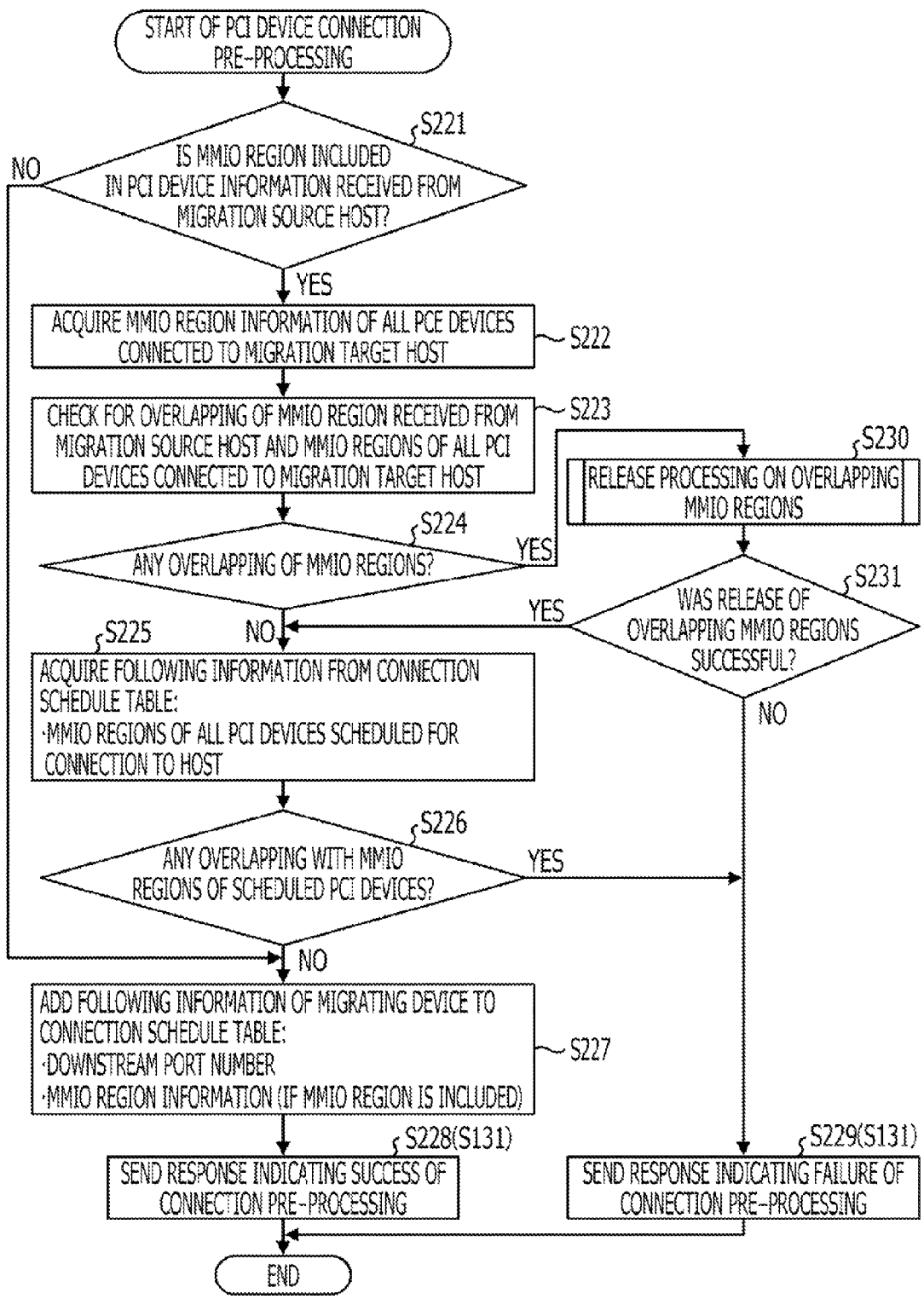
FIG. 17 is a flowchart of exemplary procedures for PCI device connection pre-processing executed by a migration target host computer according to a second embodiment.

FIG. 17 is a flowchart of exemplary procedures for PCI device connection pre-processing as conducted by a migration target host computer according to the second embodiment. The same reference numerals used in FIG. 13 are used for the same components in FIG. 17 and explanations thereof will be omitted. Steps S230 and S231 are added to FIG. 17. If overlapping between the migrating device MMIO region and an MMIO region already connected in the host computer 10b is detected (S224: Yes), step S230 is conducted.

In step S230, the connecting unit 161 carries out release processing on the MMIO region already connected in the host computer 10b. In other words, processing for making the applicable MMIO region a free region for the migrating device is conducted. If the release of the applicable MMIO region is successful (S231: Yes), processing from step S225 is conducted. If the release of the applicable MMIO region fails (S231: No), step S229 is conducted.

Figure 18:
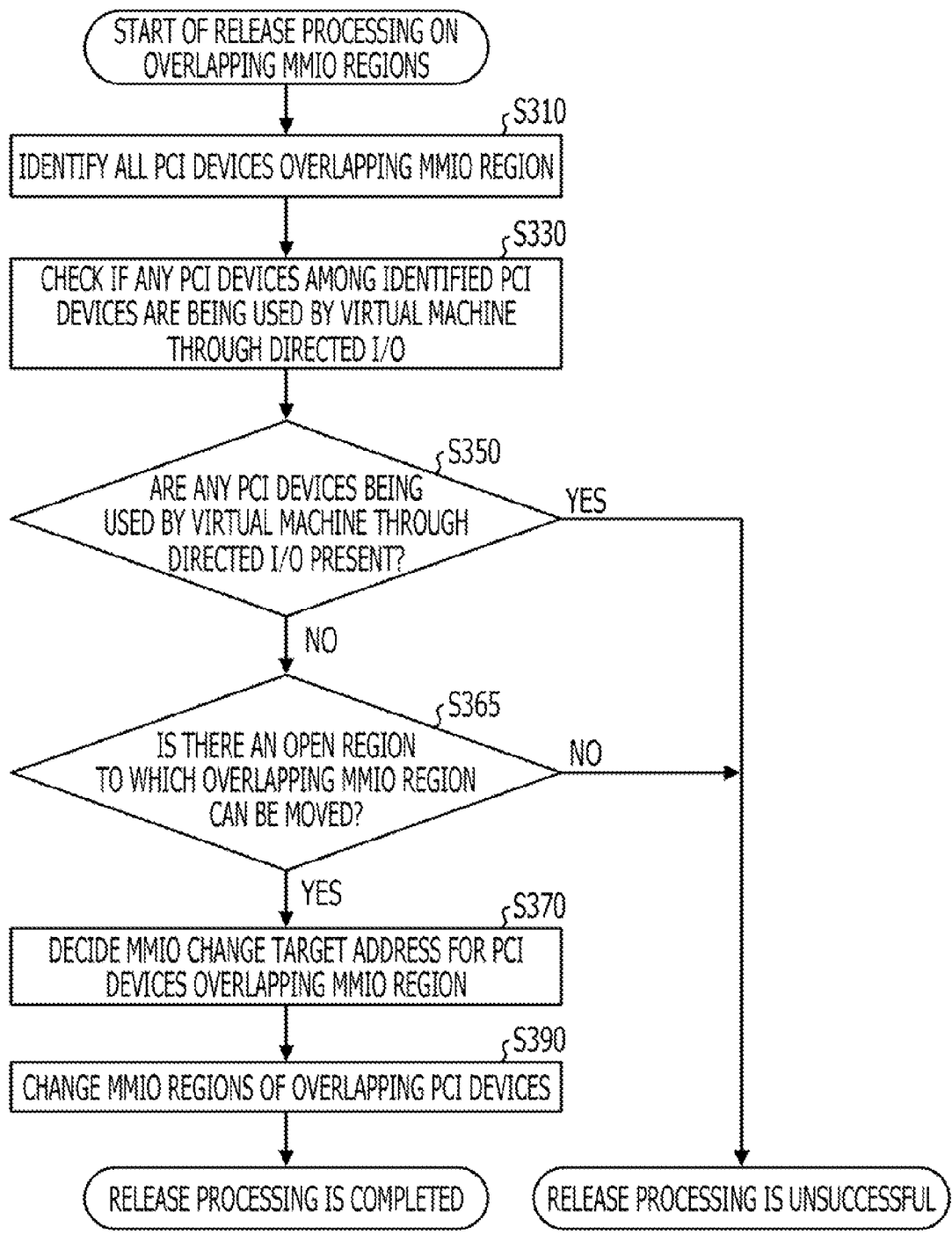
FIG. 18 is a flowchart of exemplary procedures for releasing a overlapping MMIO according to the second embodiment.

The following is a detailed description of the step S230. FIG. 18 is a flowchart of exemplary procedures for releasing an overlapping MMIO region according to the second embodiment.

In step S310, the connecting unit 161 identifies a PCI device d whose MMIO region is overlapping with the MMIO region of the migrating device from among the PCI devices d already connected in the host computer 10b. The identification of the applicable PCI device d may be conducted by comparing or cross-checking the MMIO region information of the PCI devices d already connected in the host computer 10b with the MMIO region information of the migrating device.

Next, the connecting unit 161 checks whether or not any of the PCI devices d identified in step S310 are used by the virtual machine 12 on the host computer 10b through directed I/O (S330). The checking is conducted based on whether or not BDF numbers of the applicable PCI devices d are registered in the directed I/O device list table t1 of the host computer 10b. The PCI devices d with BDF numbers registered in the directed I/O device list table t1 are PCI devices d that are used by the virtual machine 12 through directed I/O.

If PCI devices d used by the virtual machine 12 through directed I/O are present (S350: Yes), the connecting unit 161 determines that the processing to release the overlapping MMIO region is unsuccessful. The guest physical address is desirably transferred if the MMIO region host physical address of the PCI device d used through directed I/O is transferred. This is because the PCI device d used through directed I/O may not operate normally if the host physical address and the guest physical address of the MIO region do not match. However, transferring the guest physical address recognized by the virtual machine 12 is difficult. Therefore, the connecting unit 161 determines that the release processing is unsuccessful.

Conversely, if no PCI device d used by the virtual machine 12 through directed I/O is present (S350: No), the connecting unit 161 determines whether or not an open memory region to which the overlapping MMIO region can be moved is present. Specifically, with regard to all the MMIO regions that are overlapping with the migrating device MMIO region, the connecting unit 161 determines whether or not there are any mutually overlapping memory regions and whether or not there are any memory regions that do not overlap the migrating device MMIO region or the MMIO regions registered in the connection schedule table t2.

When such a free memory region is present (S365: Yes), the connecting unit 161 decides a change target host physical address for any MMIO regions that are overlapping with the migrating device MMIO region (S370). The change target host physical address may be decided in such a way that a value is selected that is not mutually overlapping with any other MMIO region and does not overlap the migrating device MMIO region or any MMIO region registered in the connection schedule table t2.

Next, the connecting unit 161 changes the host physical address of the MMIO region that overlaps the migrating device MMIO region to the value decided in step S370 (S390). Specifically, the connecting unit 161 acquires the PCI configuration space 17 of the PCI device d corresponding to the MMIO regions from the PCI configuration control unit 14. The connecting unit 161 changes the base address register value of the acquired PCI configuration space 17 to the value decided in step S370. As a result, the MMIO region overlapping with the migrating device MMIO region is transferred to a memory region that does not overlap the migrating device MMIO region.

As described above, according to the second embodiment, even if an MMIO region that overlaps the migrating device MMIO region is being used in the migration target, the overlapping MMIO region can be released in certain cases. As a result, the possibility of matching the host physical address and the guest physical address after the migration can be improved for the migrating device MMIO region. Therefore, the possibility of a successful migration processing for a virtual machine 12 using a PCI device d through directed I/O is improved.

The following is an explanation of a third embodiment. Features of the third embodiment that differ from the second embodiment will be described. Thus, items that are not mentioned in particular are substantially the same as those described in the second embodiment. A portion of the overlapping MMIO region release processing in the third embodiment differs from the second embodiment.

Figure 19:
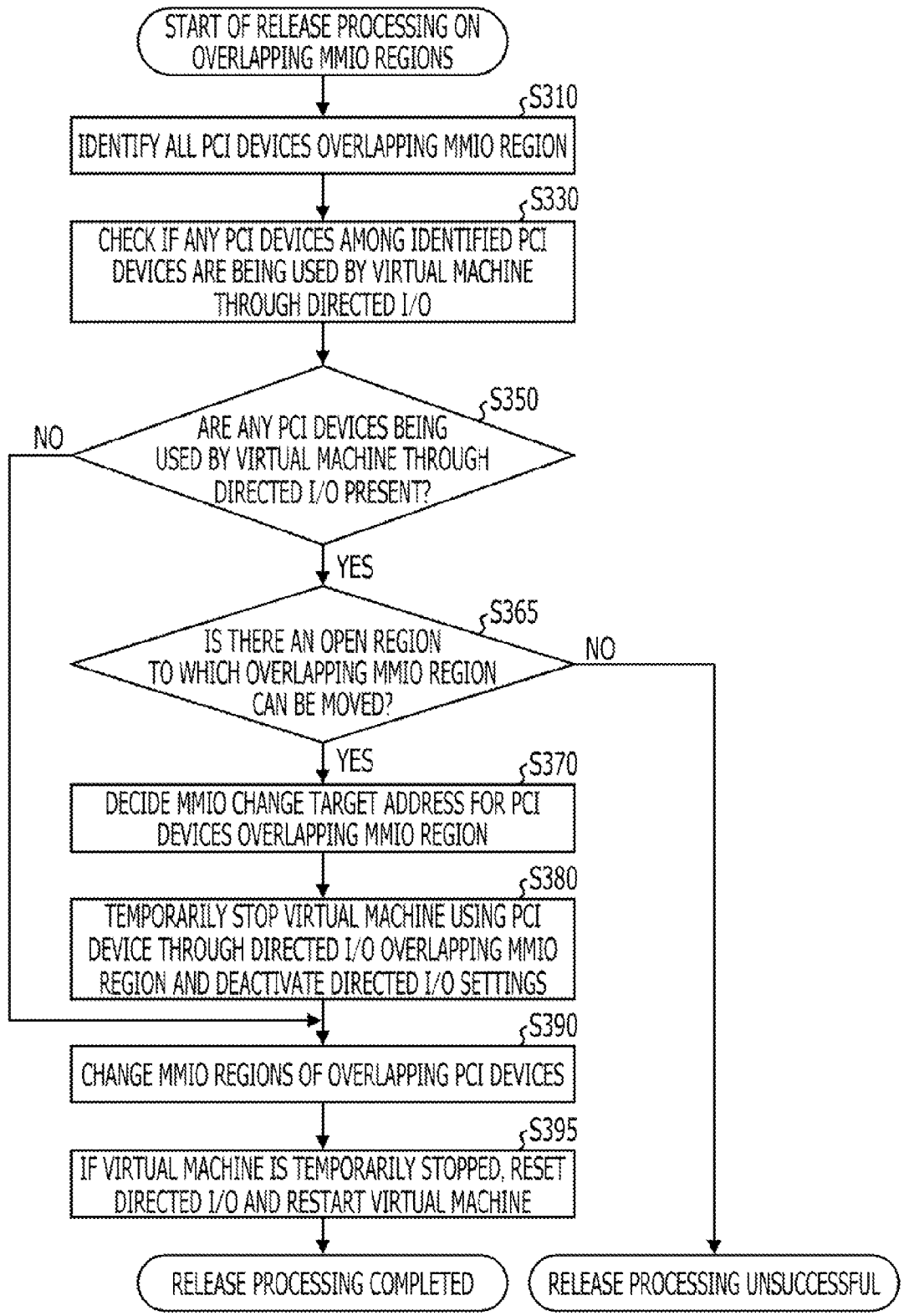
FIG. 19 is a flowchart of exemplary procedures for releasing an overlapping MMIO according to a third embodiment.

FIG. 19 is a flowchart of exemplary procedures for releasing an overlapping MMIO according to the third embodiment. Numbers used in FIG. 19 that are the same as those in FIG. 18 refer to substantially the same processes and explanations thereof will be omitted.

In FIG. 19, step S380 is conducted after step S370. In step S380, the connecting unit 161 temporarily stops the virtual machine 12 using, through directed I/O, the PCI device d with an MMIO region that overlaps the MMIO region of the migrating device. The connecting unit 161 deactivates the settings corresponding to the directed I/O of the virtual machine 12 during the temporary stoppage. For example, the connecting unit 161 specifies a VMID of the virtual machine 12 and sends a request to the I/O address converter 132 to deactivate the settings of the directed I/O. The I/O address converter 132 causes the directed I/O hardware 106 to release the address conversion table corresponding to the specified VMID. The VMID of the applicable virtual machine 12 is a VMID associated in the directed I/O device list table t1 with the BDF number of the PCI device d whose MMIO region overlaps the MMIO region of the migrating device.

Next, the connecting unit 161 changes the host physical address of the MMIO region that overlaps the migrating device MMIO region to the value decided in step S370 (S390). Specifically, the base address register value of the PCI configuration space 17 of the PCI device d corresponding to each MMIO region is changed to the value decided in step S370. Even if the virtual machine 12 is temporarily stopped, the PCI configuration space 17 of the PCI device d used by that virtual machine 12 is not released and remains available. The PCI configuration space 17 is a space created in response to the connection of the PCI device d to the host computer 10, and the life cycle of the PCI configuration space 17 basically does not depend upon the life cycle of the virtual machine 12. Therefore, in step S390, the host physical address of the MMIO region of the PCI device d used by the virtual machine 12 that is temporarily stopped in step S380 is also changed.

Next, the connecting unit 161 conducts directed I/O settings of the virtual machine 12 to restart the virtual machine 12 when the virtual machine 12 is temporarily stopped in step S380 (S395).

As described above, according to the third embodiment, overlapping MMIO regions can be released even when there is a PCI device d being used by a virtual machine 12 through directed I/O among the PCI devices d with MMIO regions overlapping the MMIO region of the migrating device. As a result, the possibility of matching the host physical address and the guest physical address corresponding to the migrating device MMIO region after the migration can be improved. Therefore, the possibility of a successful migration processing for the virtual machine 12 using a PCI device d through directed I/O is improved.

However a condition of the third embodiment is that a PCI device d being used by a virtual machine 12 through directed I/O requires the guest physical address and the host physical address related to the MMIO region to match. Thus, an example of how to remove such a condition is described in a fourth embodiment. Features of the fourth embodiment that differ from the third embodiment will be described. Thus, items that are not mentioned in particular may be substantially the same as those described in the third embodiment. A portion of the overlapping MMIO region release processing in the fourth embodiment differs from that of the third embodiment.

Figure 20:
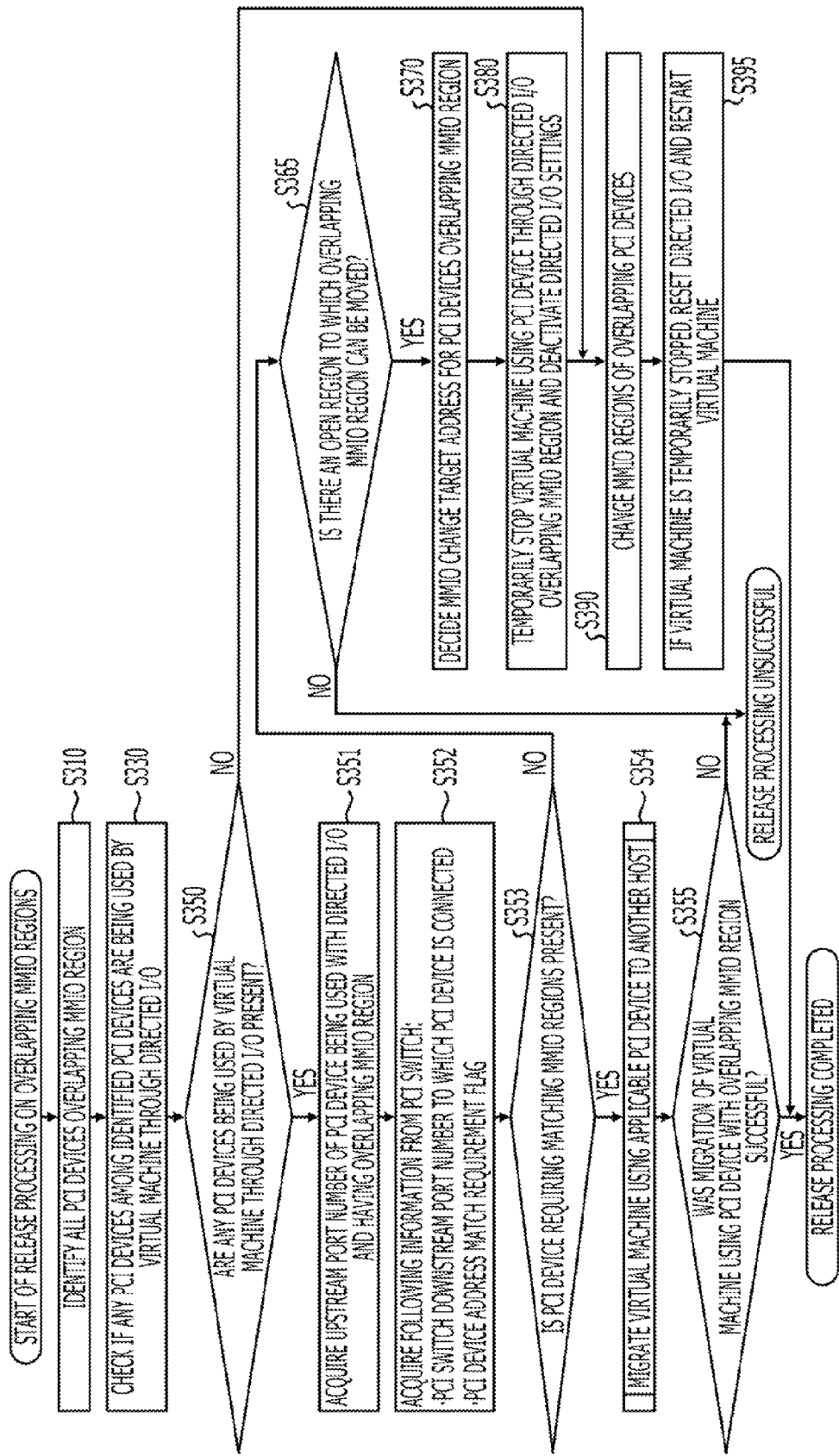
FIG. 20 is a flowchart of exemplary procedures for releasing an overlapping MMIO according to a fourth embodiment.

FIG. 20 is a flowchart describing an example of procedures for releasing an overlapping MMIO region according to the fourth embodiment. Numbers used in FIG. 20 that are the same as those in FIG. 19 refer to substantially the same processes and explanations thereof will be omitted.

Steps S351 to S355 are carried out after step S350 in FIG. 20.

In step S351, the connecting unit 161 acquires the upstream port number of a PCI device d that is being used through directed I/O by the virtual machine 12 in the migration target and whose MMIO region overlaps the MMIO region of the migrating device. The upstream port number may be acquired from the directed I/O device list table using the BDF number of the applicable PCI device d as a key.

Next, the connecting unit 161 specifies the acquired upstream port number and requests the connection control unit 21 of the PCI switch 20 to acquire the address match requirement flag and the downstream port number of the PCI device d corresponding to the upstream port number (S352). The connection control unit 21 that receives the request acquires the address match requirement flag and the downstream port number of the PCI device d corresponding to the specified upstream port number from the device attribute table 22. The connection control unit 21 sends the acquired downstream port number and address match requirement flag to the connecting unit 161.

Next, the connecting unit 161 determines the need for matching the guest physical address and the host physical address of the MMIO regions of the PCI devices d whose MMIO regions overlap the migrating device MMIO region, based on the acquired address match requirement flag (S353).

When a PCI device d is present that requires matching of the guest physical address and the host physical address (S353: Yes), the connecting unit 161 causes the activation of a migration process to migrate virtual machine 12 using the applicable PCI device d to another host computer 10 (S354). The processing described in FIG. 8, for example, for the applicable virtual machine 12 is conducted in step S354. Thus, the MMIO region of the PCI device d being used through directed I/O by the virtual machine 12 is released accompanying the migration of the applicable virtual machine 12. Moreover, matching of the guest physical address and the host physical address of the MMIO region of the applicable PCI device d may be set in the migration target.

The applicable virtual machine 12 is the virtual machine 12 corresponding to the VMID associated in the directed I/O device list table t1 with the BDF number of the applicable PCI device d. Moreover, the migration target host computer 10 may be previously set or may be automatically decided based on load conditions and the like.

When the migration processing in step S354 is completed, the connecting unit 161 determines the success or failure of the migration processing (S355). If the migration processing is successful (S355: Yes), the connecting unit 161 determines that the processing to release the overlapping MMIO regions is successful. If the migration processing fails (S355: No), the connecting unit 161 determines that the processing to release the overlapping MMIO regions is unsuccessful.

Processing related to a PCI device d for which matching of the guest physical address and the host physical address is not necessary and which is not being used by the virtual machine 12 subject to migration in step S354 (S353: No) is conducted from step S365.

As described above according to the fourth embodiment, a virtual machine 12 using a PCI device d whose MMIO region overlaps the MMIO region of the migrating device is migrated to another host computer 10. Therefore, the overlapping MMIO region can be released to allow the use of the migrating device.

Further, the necessity of matching the guest physical address and the host physical address is determined for each PCI device d based on the address match requirement flag. Therefore, migrations of virtual machines 12 that are migrated to another host computer 10 for releasing MMIO regions can be limited to only the migrations that are deemed necessary.

The following is an explanation of a fifth embodiment. Features of the fifth embodiment that differ from the fourth embodiment will be described. Thus, items that are not mentioned in particular are substantially the same as those described in the fourth embodiment. A portion of the overlapping MMIO region release processing in the fifth embodiment differs from that of the fourth embodiment.

Figure 21:
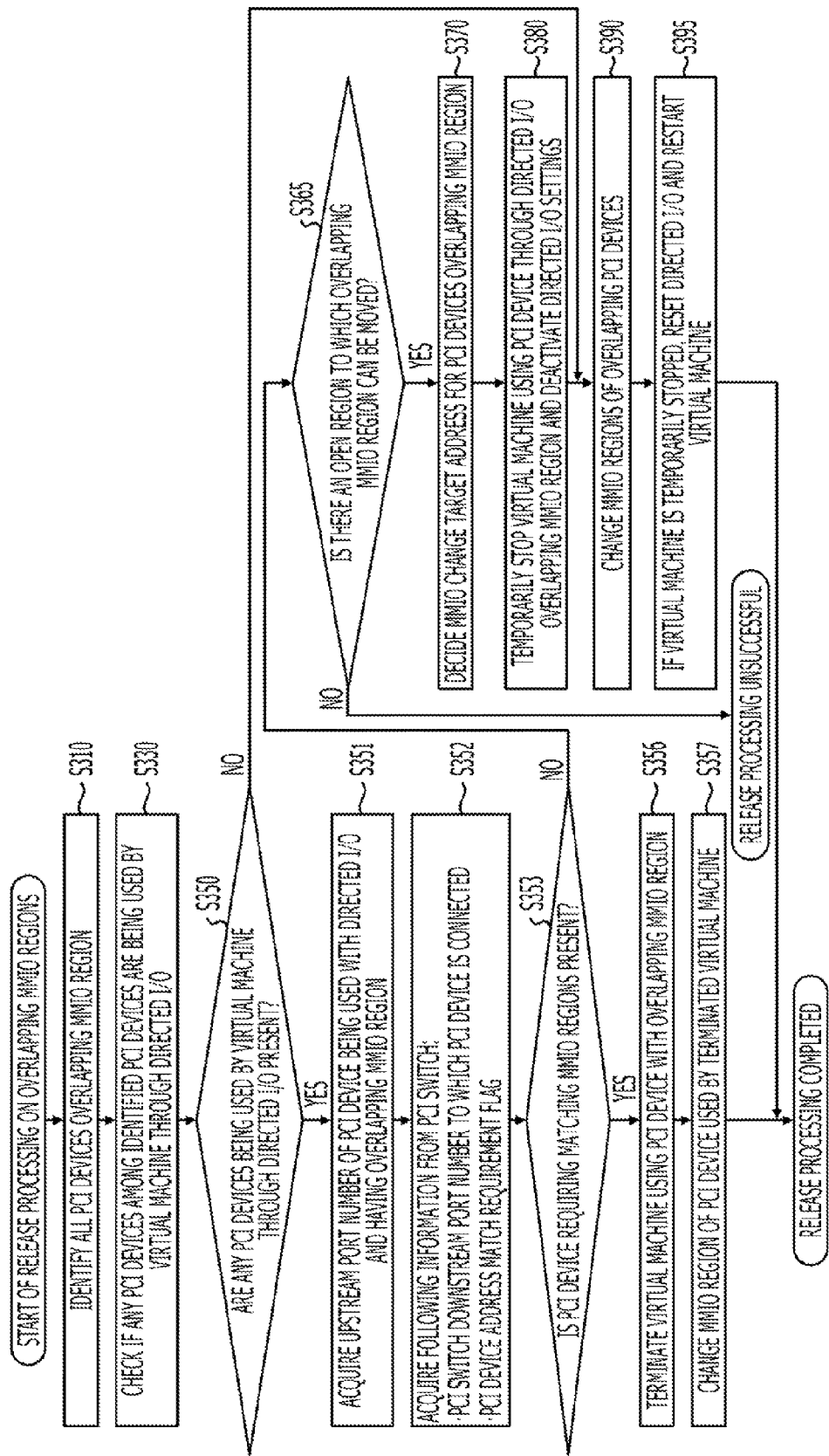
FIG. 21 is a flowchart of exemplary procedures for releasing an overlapping MMIO according to a fifth embodiment.

FIG. 21 is a flowchart describing an example of procedures for releasing an overlapping MMIO region according to the fifth embodiment. Numbers used in FIG. 21 that are substantially the same as those in FIG. 20 refer to the same processes and explanations thereof will be omitted.

In FIG. 21, steps S356 and S357 are conducted in place of steps S354 and S355 in FIG. 20, respectively.

When a PCI device d is present that requires matching of the guest physical address and the host physical address (S353: Yes), the connecting unit 161 causes the virtual machine 12 using the applicable PCI device d to be terminated (shut down) (S356). Specifically, the operating state of the applicable virtual machine 12 is stopped.

Next, the connecting unit 161 changes the MMIO region host physical address of the PCI device d being used by the terminated virtual machine 12 to a value that does not overlap the MMIO region of the migrating device (S357). More specifically, the connecting unit 161 acquires the BDF number associated with the VMID of the terminated virtual machine 12 from the directed I/O device list table t1. The connecting unit 161 specifies the acquired BDF number and acquires the PCI configuration space 17 from the PCI configuration control unit 14. The connecting unit 161 changes the base address register value of the acquired PCI configuration space 17 to a value that does not overlap the MMIO region of the migrating device.

Processing related to a PCI device d for which matching of the guest physical address and the host physical address is not necessary and that is not being used by the virtual machine 12 terminated in step S356 (S353: No) is conducted from step S365.

As described above according to the fifth embodiment, a virtual machine using a PCI device d whose MMIO region overlaps the MMIO region of the migrating device is shut down. Therefore, the overlapping MMIO region can be released to allow the use of the migrating device.

Further, the necessity of matching the guest physical address and the host physical address is determined for each PCI device d based on the address match requirement flag. Therefore, migrations of virtual machines 12 that are migrated to another host computer 10 for releasing MMIO regions can be limited to only the migrations that are deemed necessary.

The following is an explanation of a sixth embodiment. Features of the sixth embodiment that differ from the fifth embodiment will be described. Thus, items that are not mentioned in particular are substantially the same as those described in the fifth embodiment.

In the sixth embodiment, a portion of the disconnection pre-processing conducted in step S120 in FIG. 8 is different from the disconnection pre-processing described in the fifth embodiment.

Figure 22:
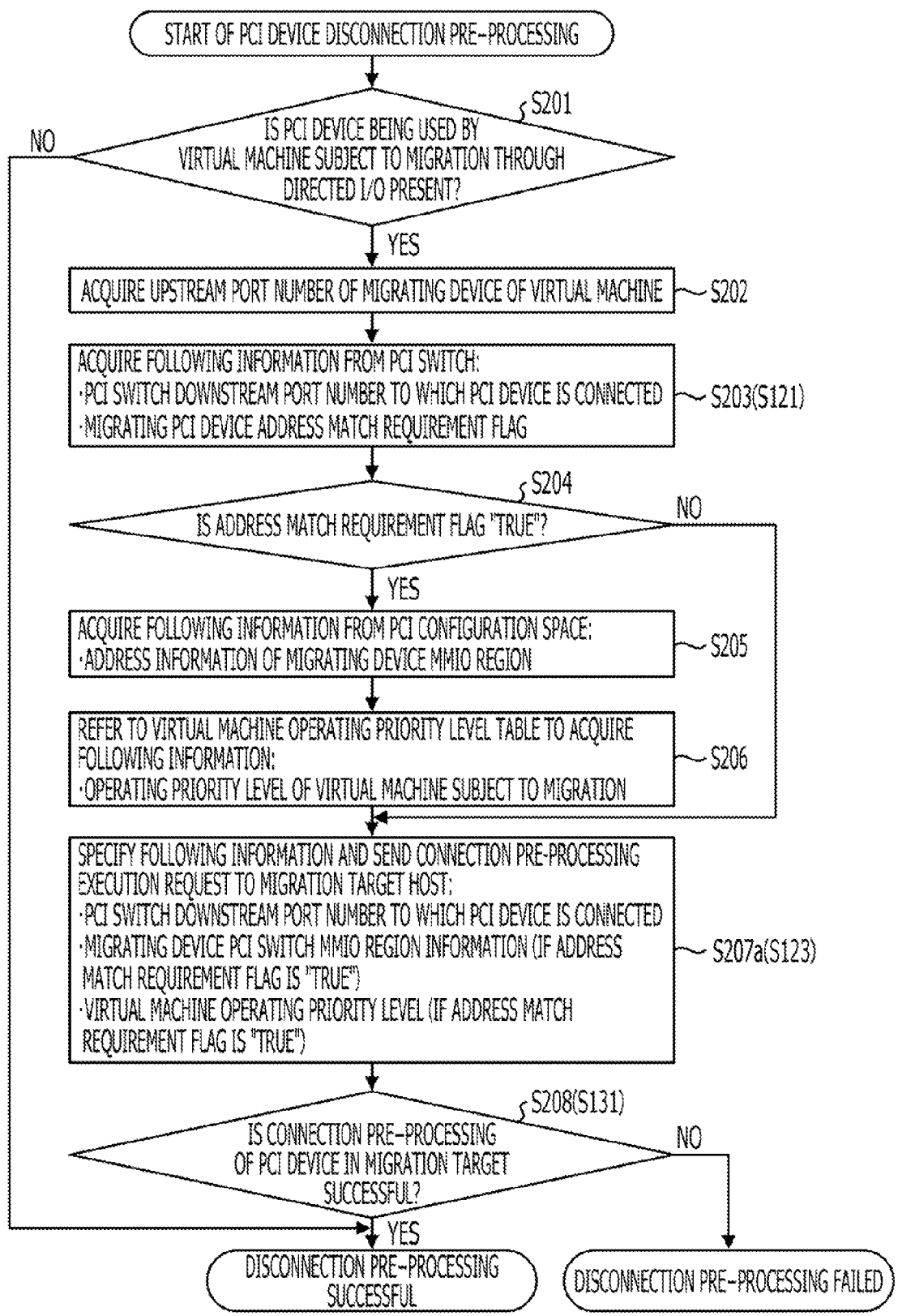
FIG. 22 is a flowchart of exemplary procedures for PCI device disconnection pre-processing conducted by the migration source host computer according to a sixth embodiment.

FIG. 22 is a flowchart describing an example of procedures for PCI device disconnection pre-processing conducted by the migration source host computer according to the sixth embodiment. Numbers used in FIG. 22 that are the same as those in FIG. 9 refer to substantially the same processes and explanations thereof will be omitted.

Step S206 is added in FIG. 22 after step S205. Further, step S207 is replaced with step S207a.

In step S206, the notification unit 151 acquires, from a virtual machine operating priority level table t3 in the migration source host computer 10a, an operating priority level of the virtual machine 12 subject to migration.

FIGS. 23A and 23B illustrate an example of a virtual machine operating priority level table. As illustrated in FIG. 23A, a VMID and an operating priority level are recorded in the virtual machine operating priority level table t3. The VMID is a virtual machine 12 identifier. The operating priority level is an index indicating the handling of the virtual machine 12 using the PCI device d corresponding to the MMIO region that overlaps the MMIO region of the migrating device, in the migrating target. The operating priority level is also an index indicating a dominant-subordinate relationship between virtual machines 12 when an MMIO region that overlaps the MMIO region of the migrating device is present.

According to the present embodiment, the operating priority level can be a value from 0 to −5. The meanings of each value are described in FIG. 23B. Specifically, the value "0" indicates that both termination and migration are not permitted. "−1" to "−4" indicate that migration is permitted but termination (shutdown) is not permitted. "−5" indicates that both migration and termination are permitted.

The virtual machine operating priority level table t3 is created, for example, in the memory device 103 of each host computer 10. Operating priority levels of operating virtual machines 12 in the host computers 10 are recorded in the virtual machine operating priority level tables t3 of each host computer 10. However, the virtual machine operating priority level table t3 may not be set up as unique tables. For example, the operating priority levels of the applicable virtual machines 12 may be recorded in the definition files of each virtual machine 12.

According to the present embodiment, the virtual machine operating priority level table t3 is an example of a priority level storage unit.

Next, the notification unit 151 sends an execution request to execute the connection pre-processing corresponding to the migrating device, to the migration target processing unit 16 of the migrating target host computer 10b (S207a). In the sixth embodiment, the operating priority level of the virtual machine 12 subject to migration is specified in the request along with the MMIO region information and the downstream port number corresponding to the migrating device. Therefore in the sixth embodiment, the operating priority level of the virtual machine 12 subject to migration is communicated to the migration target host computer 10b in the connection pre-processing execution request related to the migrating device.

A portion of the overlapping MMIO region release processing in the sixth embodiment differs from that of the fifth embodiment.

Figure 24:
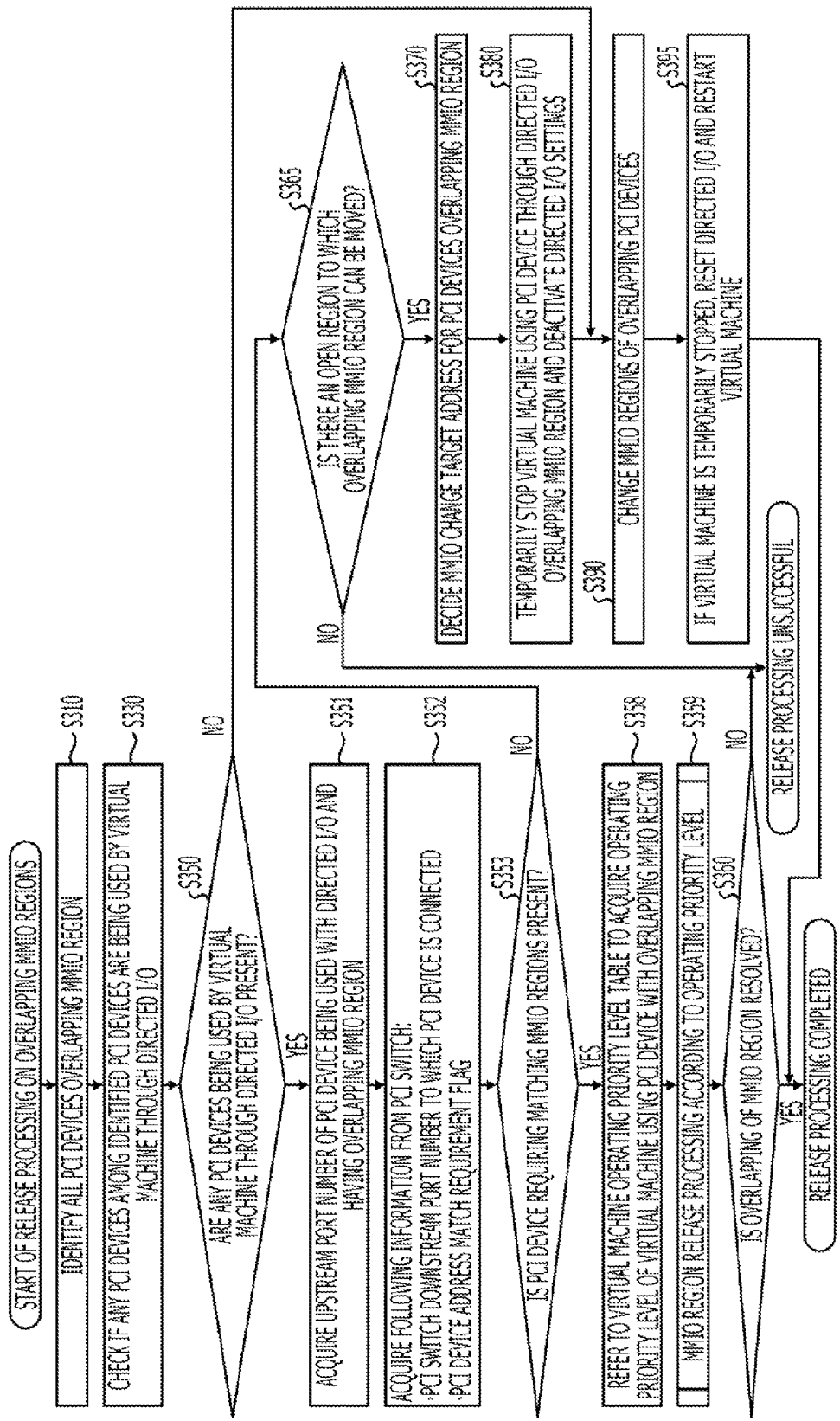
FIG. 24 is a flowchart of exemplary procedures for releasing an overlapping MMIO according to the sixth embodiment.

FIG. 24 is a flowchart describing an example of procedures for releasing an overlapping MMIO region according to the sixth embodiment. Numbers used in FIG. 24 that are the same as those in FIG. 21 refer to substantially the same processes and explanations thereof will be omitted.

In FIG. 24, steps S358 to S360 are conducted in place of steps S356 and S357 in FIG. 21.

When a PCI device d is present that requires matching of the guest physical address and the host physical address (S353: Yes), the connecting unit 161 acquires, from the virtual machine operating priority level table t3 in the host computer 10b, the operating priority level of the virtual machine 12 using the applicable PCI device d (S358). The applicable virtual machine 12 is the virtual machine 12 corresponding to the VMID associated in the directed I/O device list table t1 with the BDF number of the applicable PCI device d.

Next, the connecting unit 161 executes the release processing to release the MMIO region according to the operating priority level (S359). If the overlapping of the MMIO region is resolved by the release processing (S360: Yes), the connecting unit 161 determines that the release processing to release the overlapping MMIO region is successful. If the overlapping of the MMIO region is not resolved by the release processing (S360: No), the connecting unit 161 determines that the release processing to release the overlapping MMIO region is unsuccessful.

Processing related to a PCI device d for which matching of the guest physical address and the host physical address is not necessary and that is not being used by the virtual machine 12 subject to migration in step S358 (S353: No) is conducted from step S365.

Figure 25:
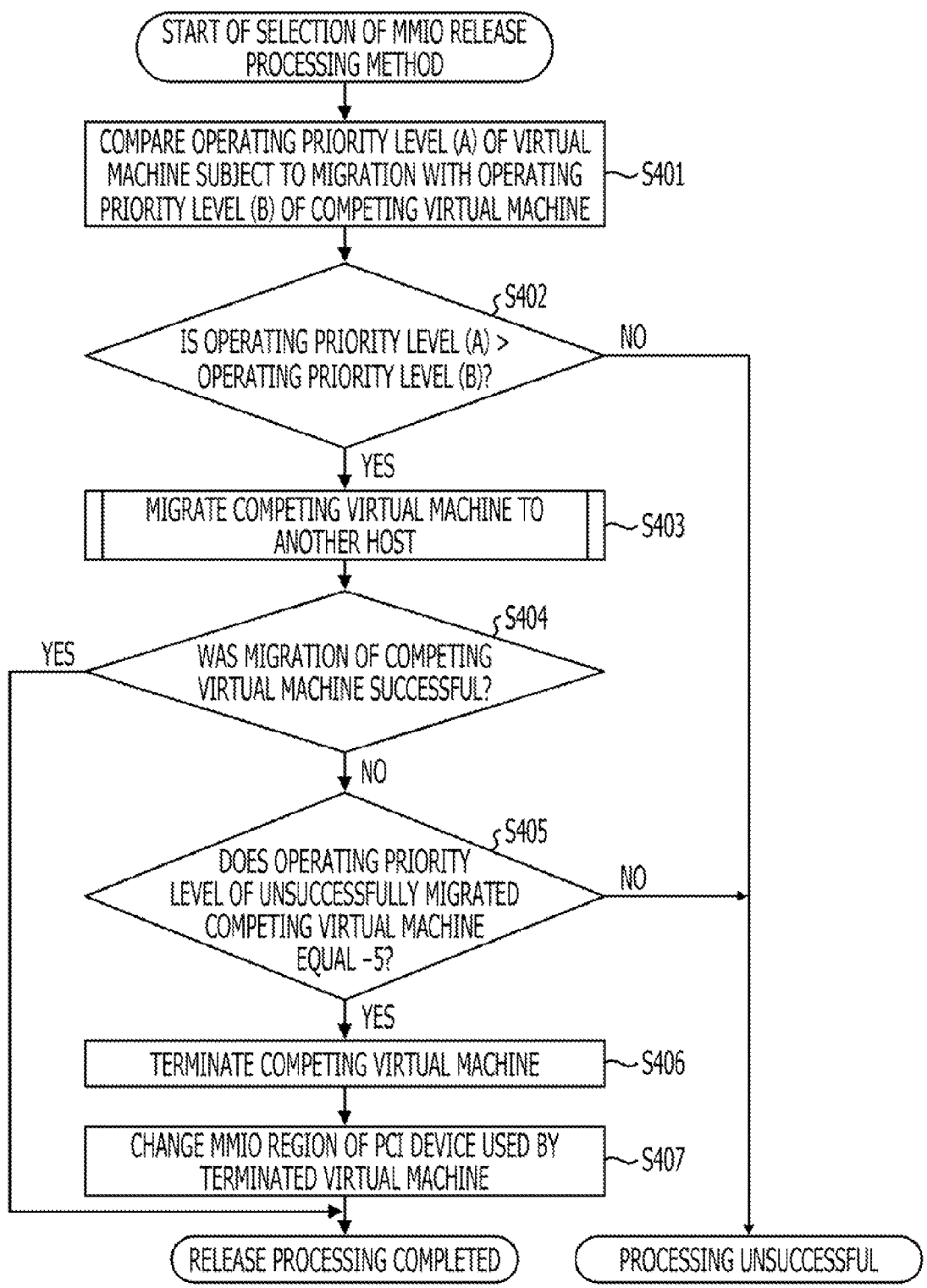
FIG. 25 is a flowchart of exemplary procedures for releasing an MMIO region according to the operating priority level.

The following is a detailed description of the step S359. FIG. 25 is a flowchart of exemplary procedures for releasing an MMIO region according to the operating priority level. In FIG. 25, a virtual machine 12 that is operating in the migration target host computer 10b and whose operating priority level is acquired in step S358 is called a "competing virtual machine 12".

In step S401, the connecting unit 161 compares the operating priority level of the virtual machine to be migrated with the operating priority level of the competing virtual machine 12. When there are multiple competing virtual machines 12, comparisons of each of the operating priority levels are conducted with the operating priority level of the virtual machine 12 subject to migration. The operating priority level of the virtual machine 12 subject to migration is the operating priority level received accompanying the connection pre-processing execution request in the migration target host computer 10b. However, the operating priority level of the virtual machine 12 subject to migration may be acquired from the migration source host computer 10a according to the timing of step S401.

When even one competing virtual machine 12 having an operating priority level not less than the operating priority level of the virtual machine 12 subject to migration exists (S402: No), the connecting unit 161 determines that the overlapping of the MMIO regions cannot be resolved.

Conversely, when the operating priority levels of all of the competing virtual machines 12 are less than the operating priority level of the virtual machine 12 subject to migration (S402: Yes), the connecting unit 161 activates the migration processing to migrate the competing virtual machines 12 to another host computer 10 (S403). The processing described in FIG. 8, for example, regarding the competing virtual machine 12 is conducted in step S403. The MMIO region of the PCI device d being used through directed I/O by the competing virtual machine 12 is therefore released accompanying the migration of the applicable competing virtual machine 12.

When the migration processing in step S403 is completed, the connecting unit 161 determines the success or failure of the migration processing (S404). When the migration processing of all the competing virtual machines 12 is completed successfully (S404: Yes), the connecting unit 161 determines that the overlapping MMIO region is resolved.

When the migration processing for even one competing virtual machine 12 fails (S404: No), the connecting unit 161 determines whether or not the operating priority level of the unsuccessfully migrated competing virtual machine 12 is "-5" (S405). Specifically, the connecting unit 161 determines whether the termination (shutdown) of the applicable competing virtual machine 12 is permitted or not.

If the operating priority level of even one competing virtual machine 12 is "-4" or higher (S405: No), the connecting unit 161 determines that the overlapping MMIO region cannot be resolved. This is because the applicable competing virtual machine 12 cannot be terminated and therefore the MMIO region overlapping the MMIO region of the migrating device cannot be released.

Conversely, if the operating priority levels of all the competing virtual machines 12 are "-5" (S405: Yes), the connecting unit 161 terminates the competing virtual machines 12 (S406). Next, the connecting unit 161 changes the MMIO region host physical address of the PCI device d being used by the terminated competing virtual machine 12 to a value that does not overlap the MMIO region of the migrating device (S407). More specifically, the connecting unit 161 acquires the BDF number associated with the VMID of the terminated competing virtual machine 12 from the directed I/O device list table t1. The connecting unit 161 specifies the acquired BDF number and acquires the PCI configuration space 17 from the PCI configuration control unit 14. The connecting unit 161 changes the base address register value of the acquired PCI configuration space 17 to a value that does not overlap the MMIO region of the migrating device.

As described above according to the sixth embodiment, the handling of the virtual machine 12 using the PCI device d corresponding to the MMIO region that overlaps the MMIO region of the migrating device can be changed based on the comparison with the priority level of the virtual machine 12 subject to migration. Thus migration and termination of the virtual machines 12 can be controlled according to the level of importance of the virtual machines 12 instead of forcefully migrating or terminating the applicable virtual machines 12.

Additionally, previously setting PCI configuration spaces so that they do not overlap MMIO regions among all the host computers 10 in which migration can be conducted is conceivable in order to avoid overlapping with the MMIO region of a migrating device.

However, some PCI devices d such as graphics cards and the like use large (e.g., 256 MB to 1 GB) MMIO regions. Therefore, when such PCI devices d are connected to host computers 10, it is possible that allocatable regions related to all of the PCI devices d may become unavailable when trying to prevent the overlapping of PCI device d MMIO regions.

Conversely, overlapping of the MMIO regions is automatically resolved according to the present embodiment. Therefore, generation of the abovementioned problem can be avoided.

While the embodiments of the present invention have been described above, the present invention is not limited to the above-described embodiments and various improvements and modifications are possible without departing from the spirit of the invention as described in the claims.

What is claimed is:
1. A virtual machine migration system comprising:
a virtual machine running on a migration source computer and to be migrated to a migration target computer;
the migration source computer comprising:
a first memory configured to store a first computer executable program; and
a first processor coupled to the first memory and configured to
send host physical address information including a starting address of an MMIO region corresponding to a device used by the virtual machine through directed I/O to the migration target computer, and
cause a connection target of the device to be switched to the migration target computer by a switching device; and
the migration target computer comprising:
a second memory configured to store a second computer executable program; and
a second processor coupled to the second memory and configured to
allocate an MMIO region corresponding to the host physical address information sent by the migration source computer, to the device connected to the migration target computer by the switching device such that the MMIO region that is the same as the MMIO region in the migration source computer is allocated in the migration target computer,
wherein the allocating of the MMIO region causes the MMIO region to be migrated to a region that does not overlap the region corresponding to the host physical address information when an MMIO region having a portion that overlaps the region corresponding to the host physical address information sent by the migration source computer is being used in the migration target computer.
2. The virtual machine migration system according to claim 1, the first processor being further configured to
store information indicating a need to match a guest physical address and a host physical address related to an MMIO region for each device; wherein
in the allocating, to the device, the MMIO region corresponding to the host physical address information sent by the migration source computer when the information is stored and corresponding to the device connected to migration source computer and the migration target computer by the switching device indicates that the host physical address and the guest physical address need to match.

3. The virtual machine migration system according to claim 1, wherein:
the allocating records the host physical address information sent by the migration source computer related to a first virtual machine among multiple virtual machines subject to migration, and, when a region corresponding to the host physical address information sent by the migration source computer or by another migration source computer related to a second virtual machine includes a portion that overlaps a region corresponding to the host physical address information that is recorded, does not record the host physical address information related to the second virtual machine, and allocates the MMIO region corresponding to the host physical address information recorded.

4. The virtual machine migration system of claim 1, wherein
the switching device is a PCI switch including a third memory configured to store a third computer executable program and a third processor coupled to the third memory,
the third processor is configured to change connection of the device from the migration source computer to the migration target computer, and the device is a PCI device.

5. A virtual machine migration system comprising:
a virtual machine running on a migration source computer and to be migrated to a migration target computer;
the migration source computer comprising:
a first memory configured to store a first computer executable program; and
a first processor coupled to the first memory and configured to
send host physical address information including a starting address of an MMIO region corresponding to a device used by the virtual machine through directed I/O to the migration target computer, and
cause a connection target of the device to be switched to the migration target computer by a switching device; and
the migration target computer comprising:
a second memory configured to store a second computer executable program; and
a second processor coupled to the second memory and configured to
allocate an MMIO region corresponding to the host physical address information sent by the migration source computer, to the device connected to the migration target computer by the switching device such that the MMIO region that is the same as the MMIO region in the migration source computer is allocated in the migration target computer,
wherein the allocating of the MMIO region causes the virtual machine using the device corresponding to the MMIO region in the migration target computer to be migrated to another computer when an MMIO region having a portion that overlaps the region corresponding to the host physical address information sent by the migration source computer is being used in the migration target computer.

6. The virtual machine migration system according to claim 5, wherein:
the allocating causes the virtual machine using the device corresponding to the MMIO region in the migration target computer to be shut down when an MMIO region having a portion that overlaps the region corresponding to the host physical address information sent by the migration source computer is being used in the migration target computer.

7. The virtual machine migration system according to claim 6, the first processor being further configured to store a priority level of each virtual machine, wherein
the allocating causes the second virtual machine having a priority level lower than the priority level of a virtual machine subject to migration, to be migrated or shut down when an MMIO region having a portion that overlaps the region corresponding to the host physical address information sent by the migration source computer is being used in the migration target computer.

8. A non-transitory computer-readable storage medium storing a virtual machine migration program that causes a computer to execute operations to migrate a virtual machine, the operations comprising:
sending, when the computer is a migration source, host physical address information including a starting address of an MMIO region corresponding to a device used by the virtual machine through directed I/O to a migration target computer, and causing a connection target of the device to be switched to the migration target computer by a switching device; and
allocating, when the computer is a migration target, an MMIO region corresponding to the host physical address information sent by the migration source computer, to the device connected to the migration target computer by the switching device such that the MMIO region that is the same as the MMIO region in the migration source computer is allocated in the migration target computer,
wherein the allocating causes the MMIO region to be migrated to a region that does not overlap the region corresponding to the host physical address information when an MMIO region having a portion that overlaps the region corresponding to the host physical address information sent by the migration source computer is being used in the computers.

9. The computer-readable storage medium according to claim 8, wherein:
the allocating allocates, to the device, the MMIO region corresponding to the host physical address information sent by the migration source computer when information related to a device connected to the computers by the switching device, is stored and that stores information indicating the need to match the host physical address and the guest physical address in relation to the MMIO region for each device.

10. The computer-readable storage medium according to claim 8 wherein:
the allocating records the host physical address information sent by the migration source computer related to a first virtual machine among multiple virtual machines subject to migration, and, when a region corresponding to the host physical address information sent by the migration source computer or by another migration source computer related to a second virtual machine includes a portion that overlaps a region corresponding to the host physical address information recorded, does not record the host physical address information related to the second virtual machine, and allocates the MMIO region corresponding to the host physical address information recorded.

11. A non-transitory computer-readable storage medium storing a virtual machine migration program that causes a computer to execute operations to migrate a virtual machine, the operations comprising:
- sending, when the computer is a migration source, host physical address information including a starting address of an MMIO region corresponding to a device used by the virtual machine through directed I/O to a migration target computer, and causing a connection target of the device to be switched to the migration target computer by a switching device; and
- allocating, when the computer is a migration target, an MMIO region corresponding to the host physical address information sent by the migration source computer, to the device connected to the migration target computer by the switching device such that the MMIO region that is the same as the MMIO region in the migration source computer is allocated in the migration target computer,
- wherein the allocating causes the virtual machine using the device corresponding to the MMIO region in the computers to be migrated to another computer when an MMIO region having a portion that overlaps the region corresponding to the host physical address information sent by the migration source computer is being used in the computers.

12. The computer-readable storage medium according to claim 11, wherein:
- the allocating causes the virtual machine using the device corresponding to the MMIO region in the computers to be shut down when an MMIO region having a portion that overlaps the region corresponding to the host physical address information sent by the migration source computer is being used in the computers.

13. The computer-readable storage medium according to claim 12, wherein:
- the allocating causes the second virtual machine to be migrated or shut down when a priority level, which is recorded, of the second virtual machine using the device corresponding to the MMIO region in the computers is lower than a priority level, which is recorded, of the virtual machine subject to migration, when an MMIO region having a portion that overlaps the region corresponding to the host physical address information sent by the migration source computer is being used in the computers.

14. A virtual machine migration method conducted in a virtual machine migration system that includes a virtual machine of a migration source computer and a migrating target computer, the method comprising:
- sending, by the migration source computer, host physical address information including a starting address of an MMIO region corresponding to a device used by the virtual machine through directed I/O to a migration target computer, and causing a connection target of the device to be switched to the migration target computer by a switching device; and
- allocating, by the migration target computer, an MMIO region corresponding to the host physical address information sent by the migration source computer, to the device connected to the migration target computer by the switching device such that the MMIO region that is the same as the MMIO region in the migration source computer is allocated in the migration target computer,
- wherein the allocating causes the MMIO region to be migrated to a region that does not overlap the region corresponding to the host physical address information when an MMIO region having a portion that overlaps the region corresponding to the host physical address information sent by the migration source computer is being used in the migration target computer.

15. The virtual machine migration method according to claim 14, wherein
- the allocating allocates, to the device, the MMIO region corresponding to the host physical address information sent by the migration source computer when information related to a device connected to the computers by the switching device, is stored and that stores information indicating the need to match the host physical address and the guest physical address in relation to the MMIO region for each device.

16. The virtual machine migration method according to claim 14, wherein
- the allocating records the host physical address information sent by the migration source computer related to a first virtual machine among multiple virtual machines subject to migration, and, when a region corresponding to the host physical address information sent by the migration source computer or by another migration source computer related to a second virtual machine includes a portion that overlaps a region corresponding to the host physical address information recorded, does not record the host physical address information related to the second virtual machine, and allocates the MMIO region corresponding to the host physical address information recorded.

17. A virtual machine migration method conducted in a virtual machine migration system that includes a virtual machine of a migration source computer and a migrating target computer, the method comprising:
- sending, by the migration source computer, host physical address information including a starting address of an MMIO region corresponding to a device used by the virtual machine through directed I/O to a migration target computer, and causing a connection target of the device to be switched to the migration target computer by a switching device; and
- allocating, by the migration target computer, an MMIO region corresponding to the host physical address information sent by the migration source computer, to the device connected to the migration target computer by the switching device such that the MMIO region that is the same as the MMIO region in the migration source computer is allocated in the migration target computer,
- wherein the allocating causes the virtual machine using the device corresponding to the MMIO region in the migration target computer to be migrated to another computer when an MMIO region having a portion that overlaps the region corresponding to the host physical address information sent by the migration source computer is being used in the migration target computer.

18. The virtual machine migration method according to claim 17, wherein
- the allocating causes the virtual machine using the device corresponding to the MMIO region in the migration target computer to be shut down when an MMIO region having a portion that overlaps the region corresponding to the host physical address information sent by the migration source computer is being used in the migration target computer.

19. The virtual machine migration method according to claim 18, wherein
- the allocating causes the second virtual machine to be migrated or shut down when a priority level, which is recorded, of the second virtual machine using the device corresponding to the MMIO region in the computer is lower than a priority level, which is recorded, of the virtual machine subject to migration, when an MMIO region having a portion that overlaps the region corresponding to the host physical address information sent by the migration source computer is being used in the computer.

* * * * *